Inventors:
Richard B. Stanley
Bernard Pass
By Zahl & Gutzbaugh
Attorneys

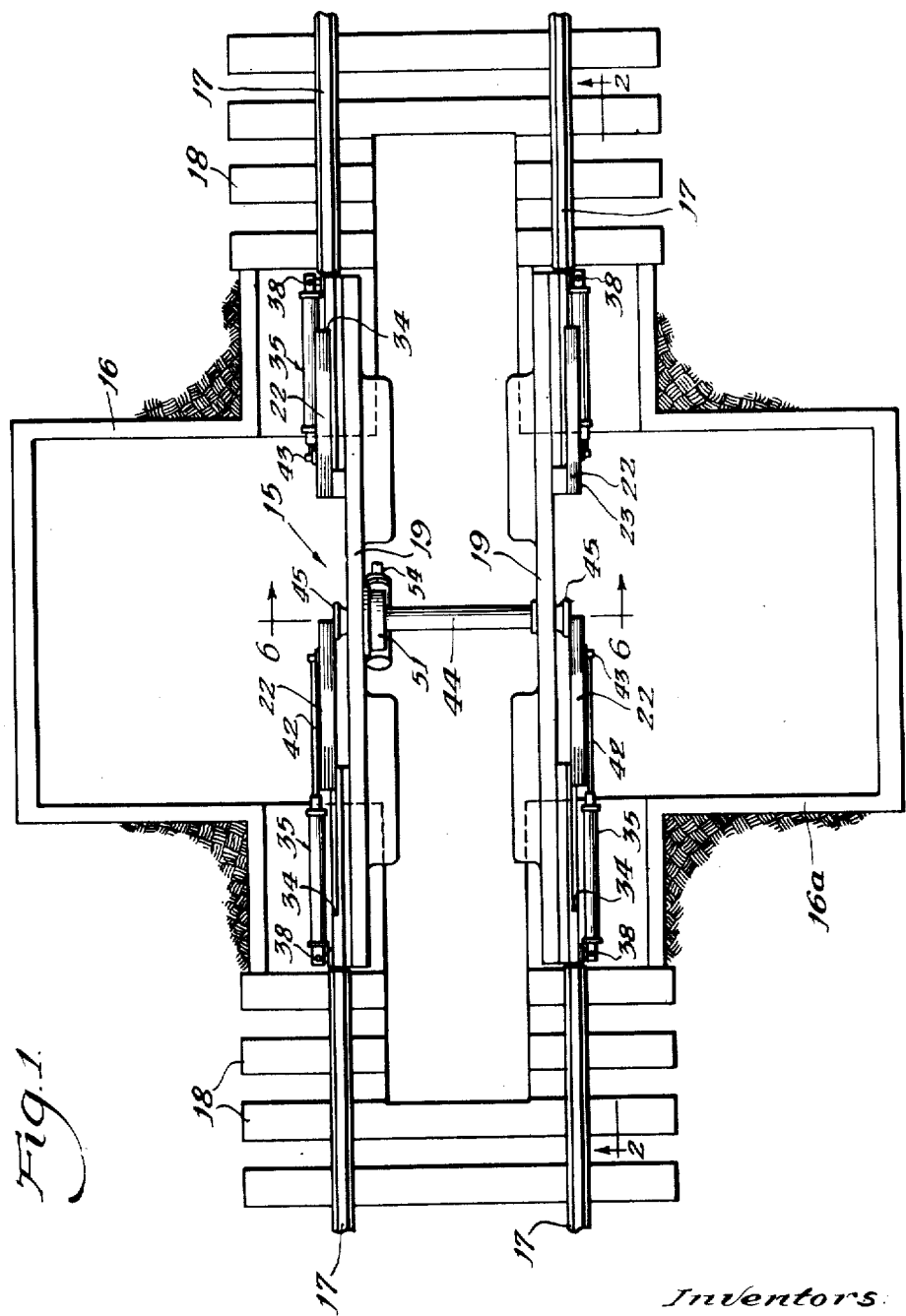

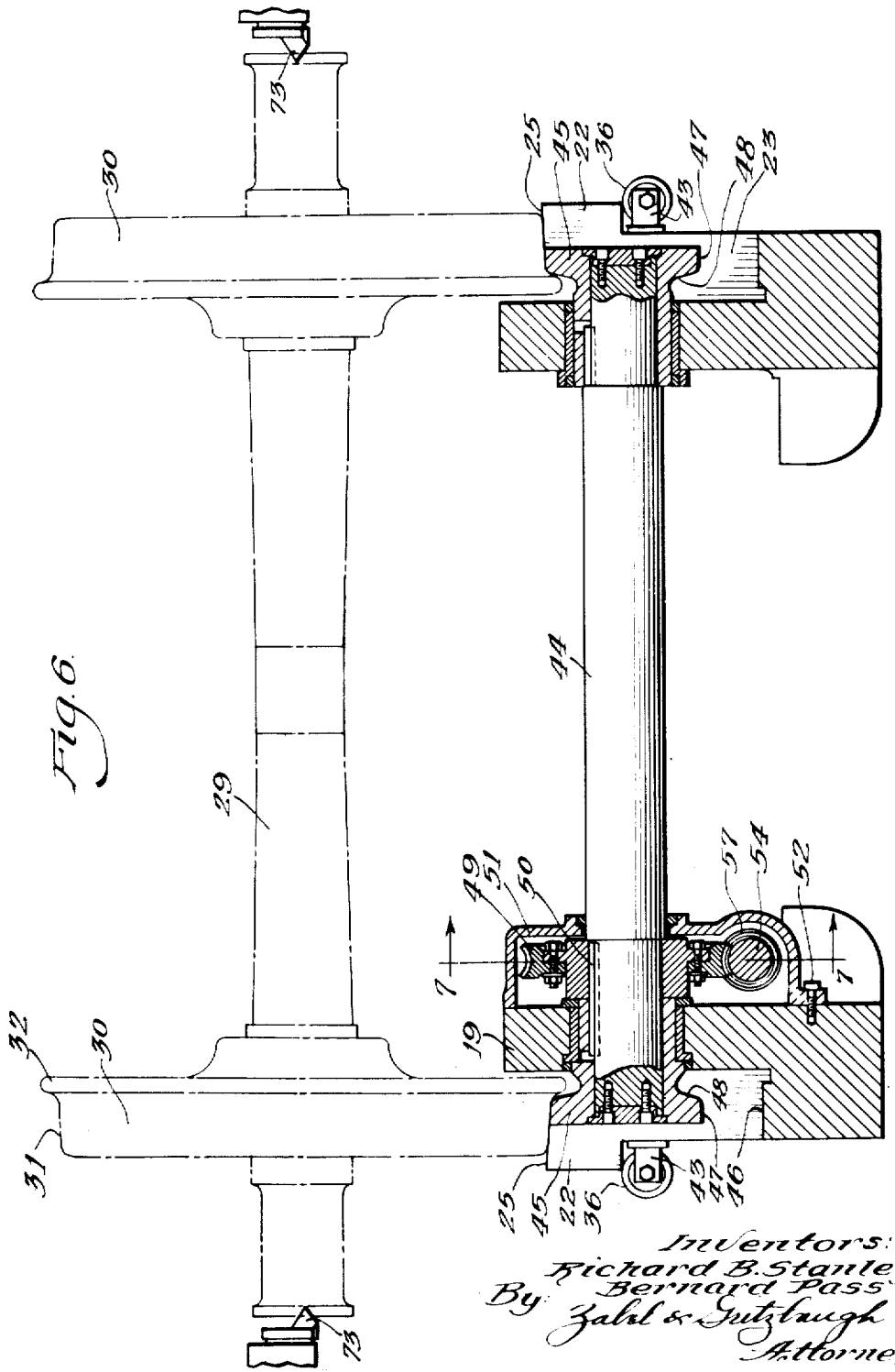

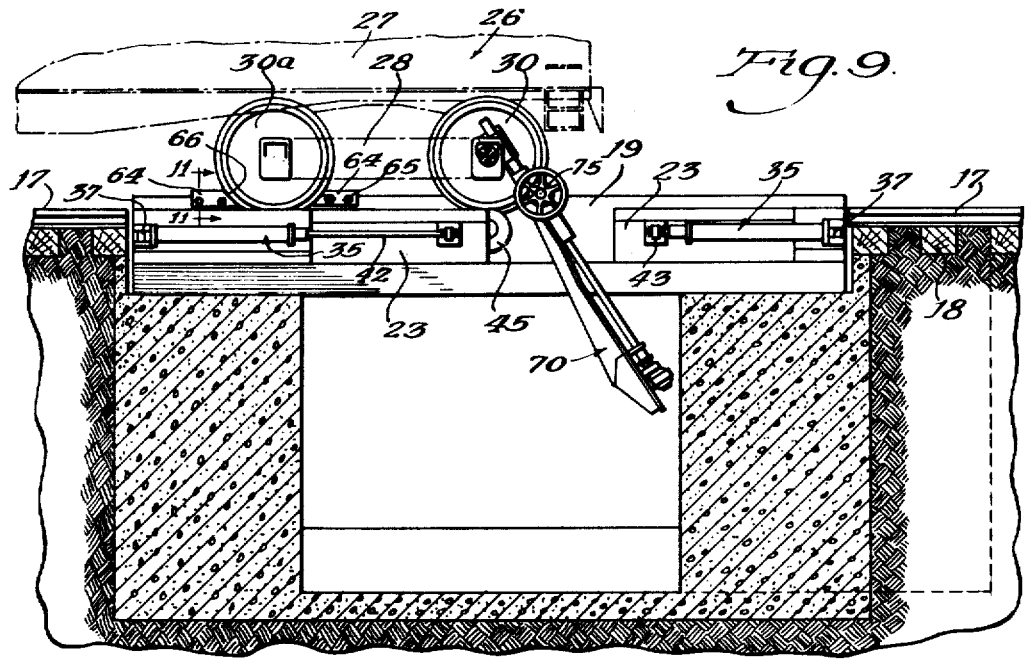
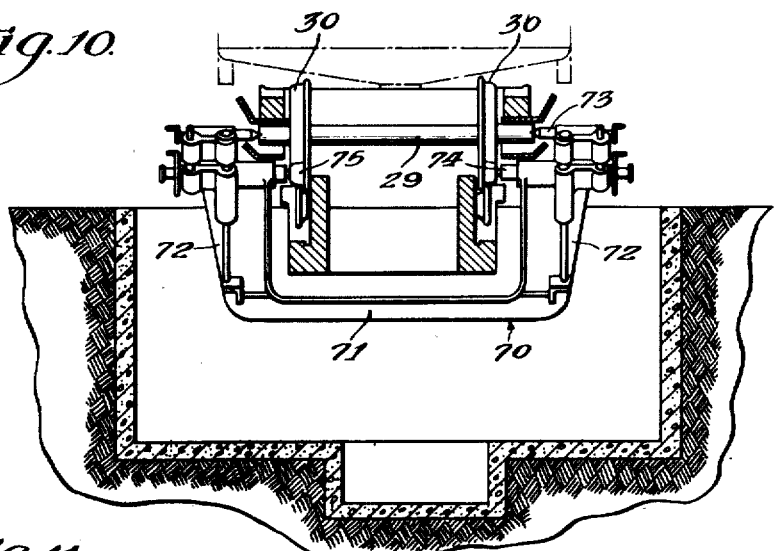
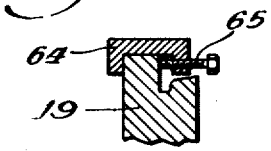

Dec. 23, 1952     R. B. STANLEY ET AL     2,622,378
WHEEL SUPPORTING AND ROTATING DEVICE
Filed July 10, 1948     18 Sheets-Sheet 7

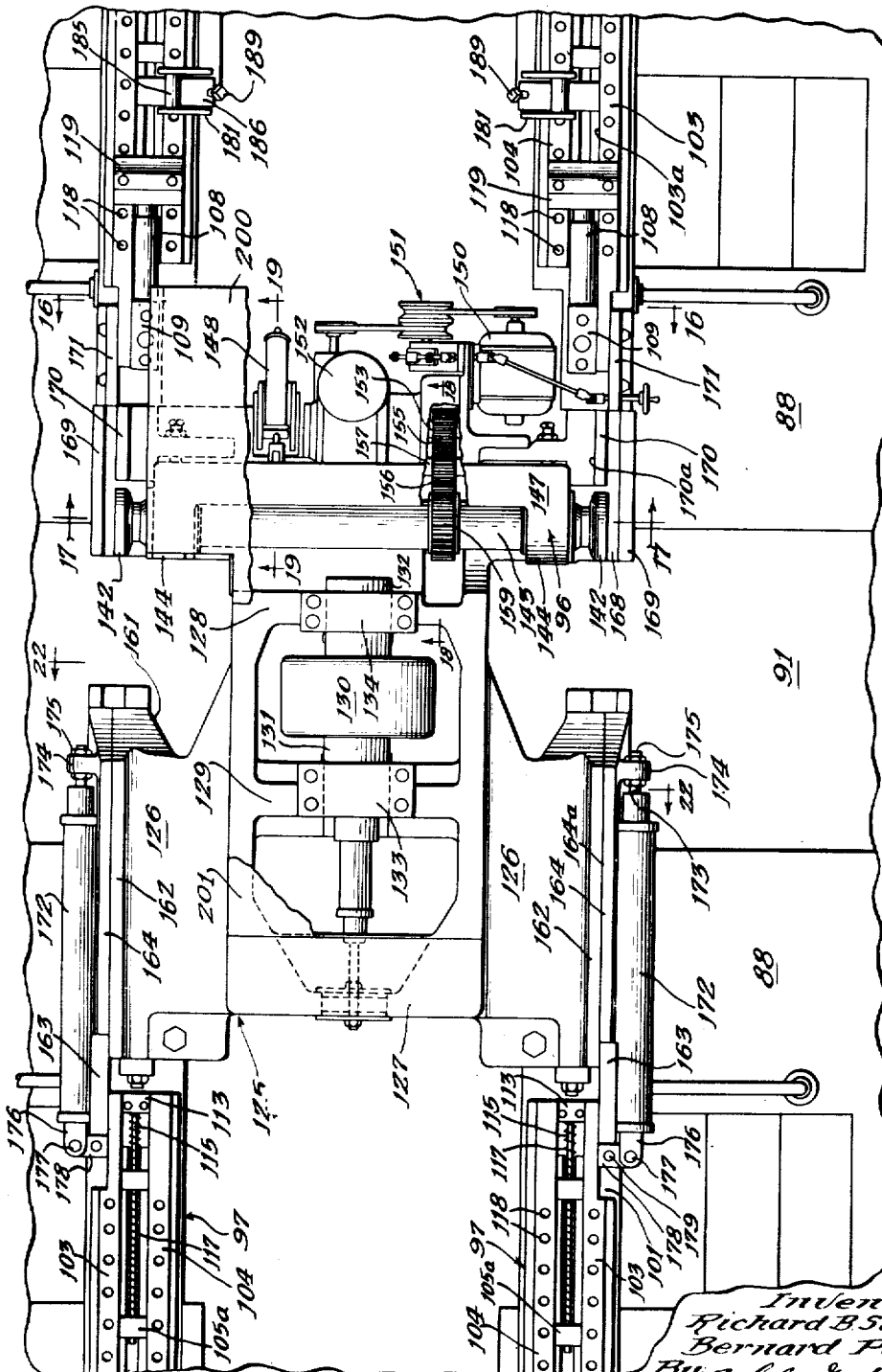

Dec. 23, 1952  R. B. STANLEY ET AL  2,622,378
WHEEL SUPPORTING AND ROTATING DEVICE
Filed July 10, 1948  18 Sheets-Sheet 9
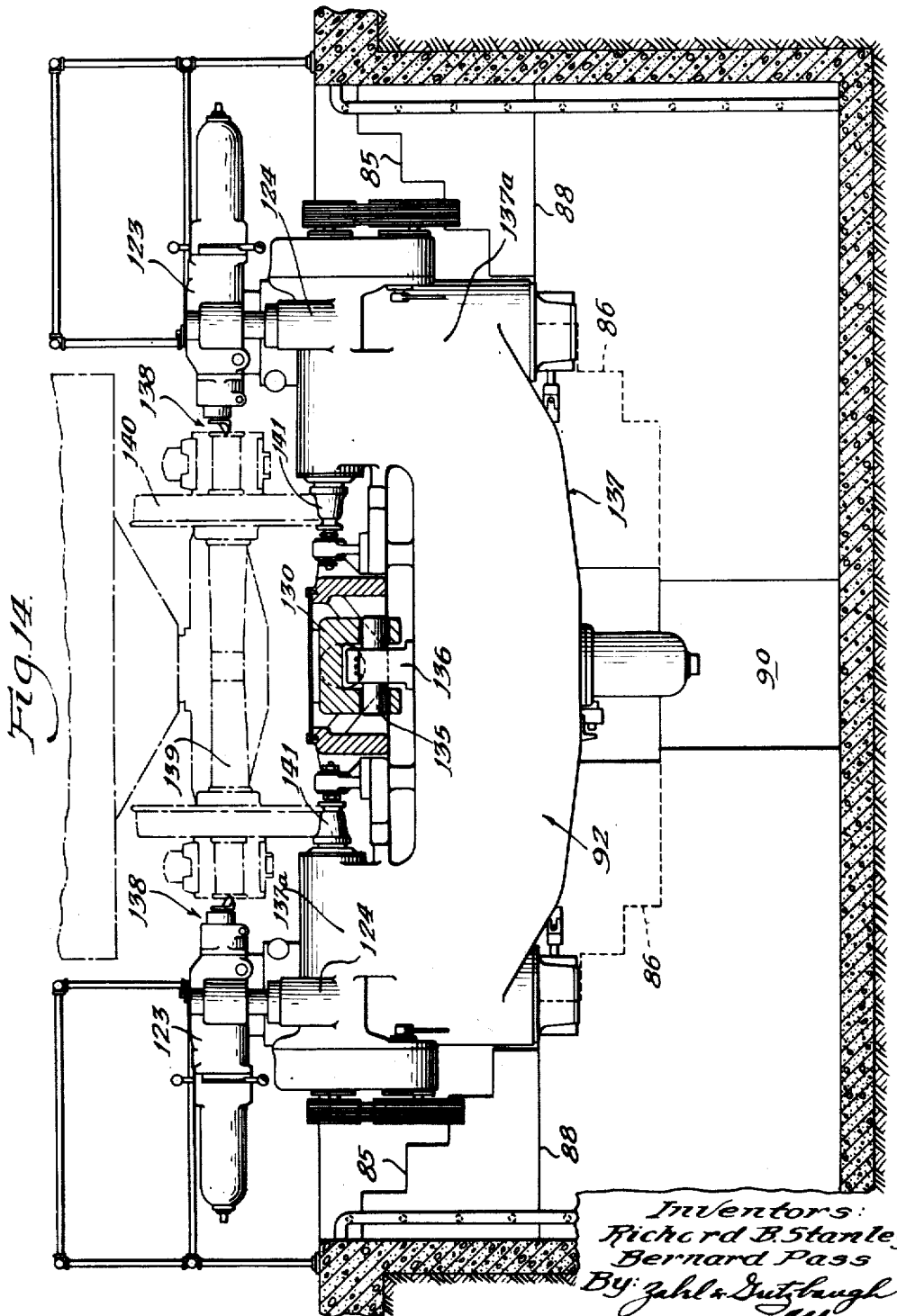
Inventors:
Richard B. Stanley
Bernard Pass
By: Zahl & Dutzbaugh
Attorneys Dec. 23, 1952  R. B. STANLEY ET AL  2,622,378
WHEEL SUPPORTING AND ROTATING DEVICE
Filed July 10, 1948  18 Sheets-Sheet 10
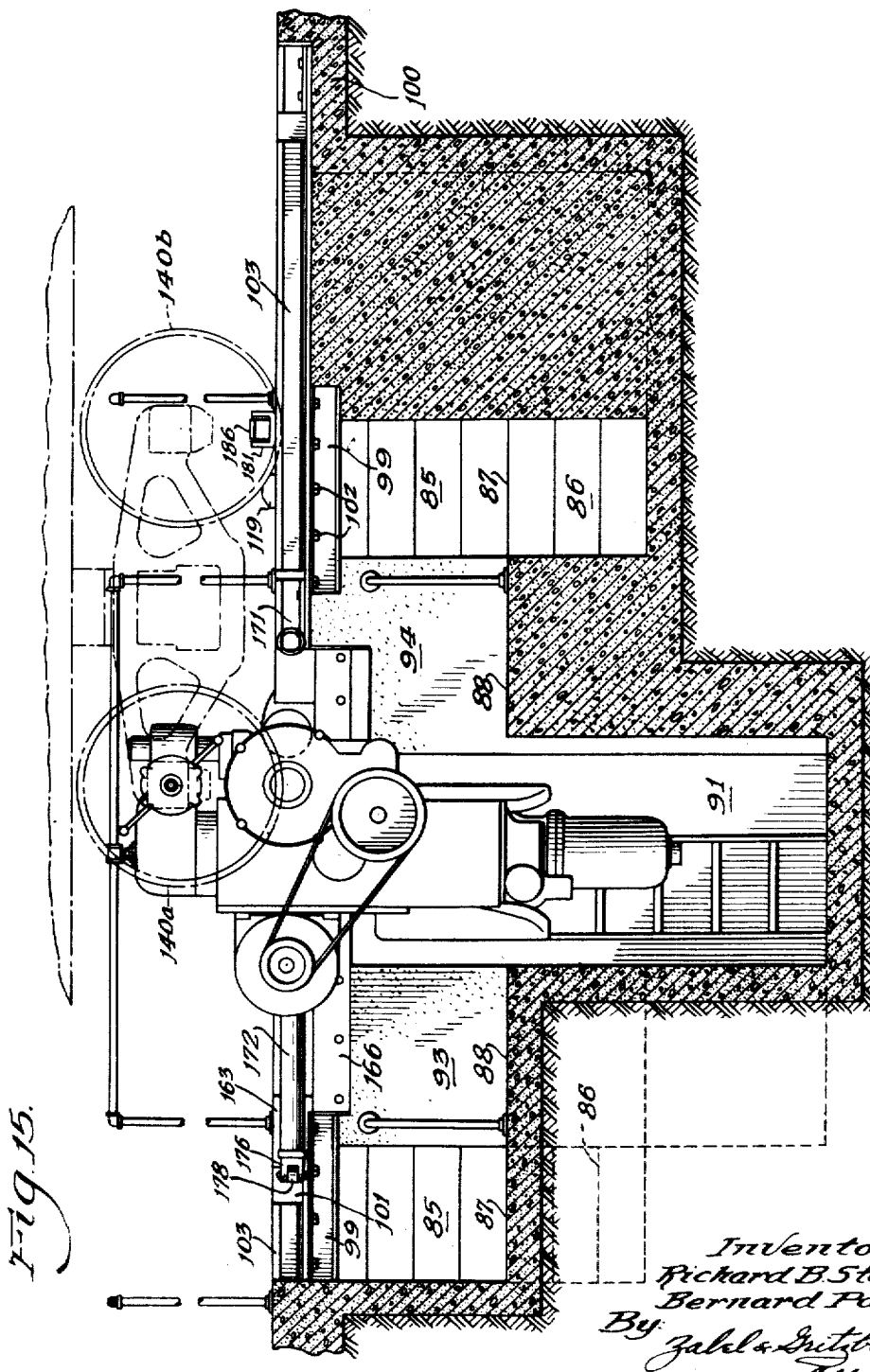
Inventors
Richard B. Stanley
Bernard Pass
By Zabel & Fitzhaugh
Attorneys

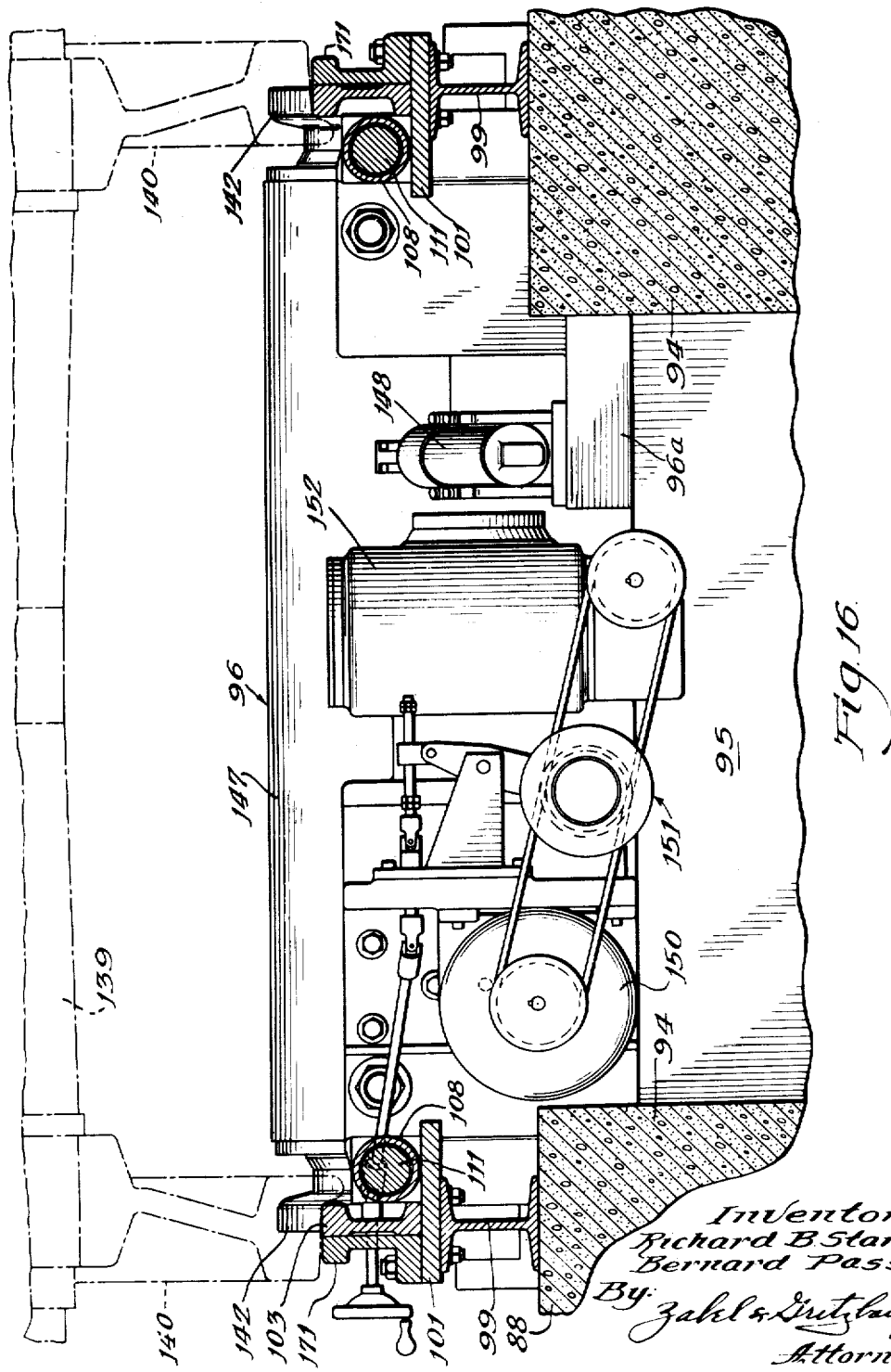

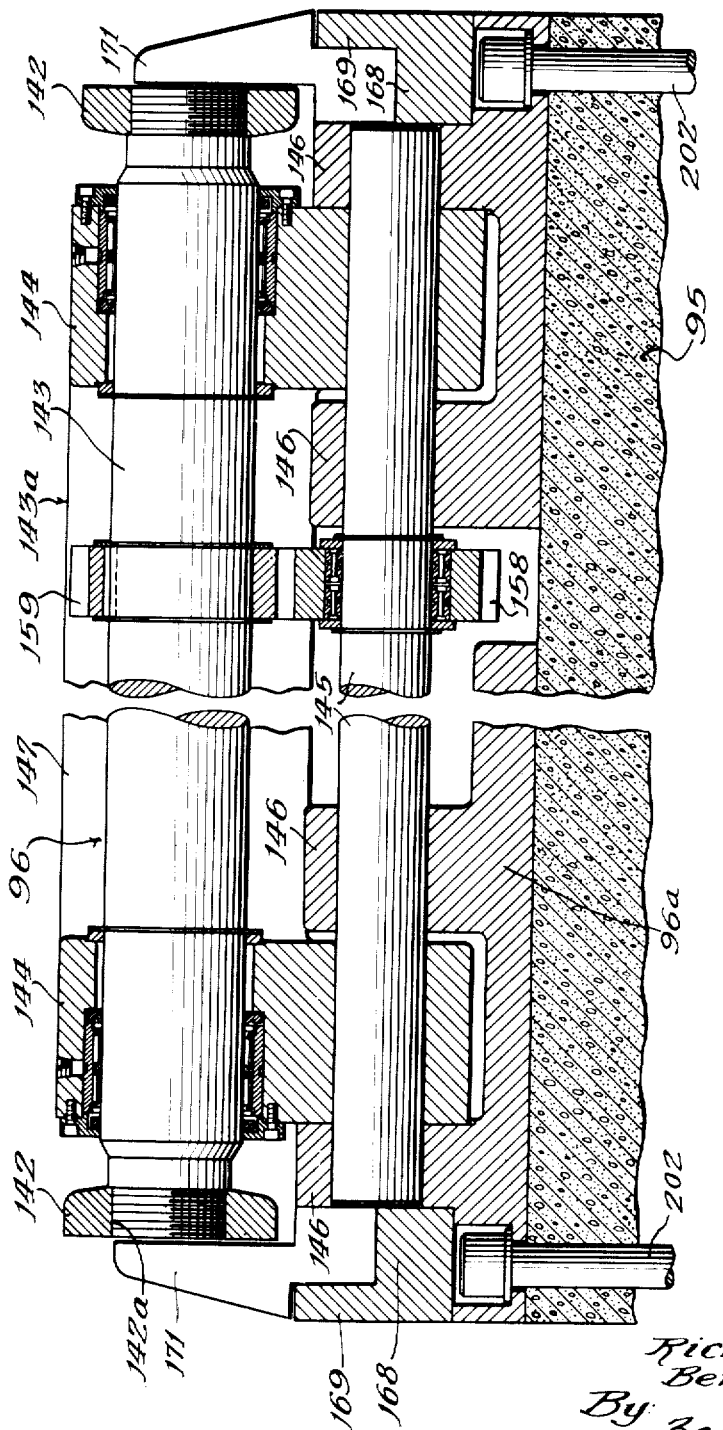

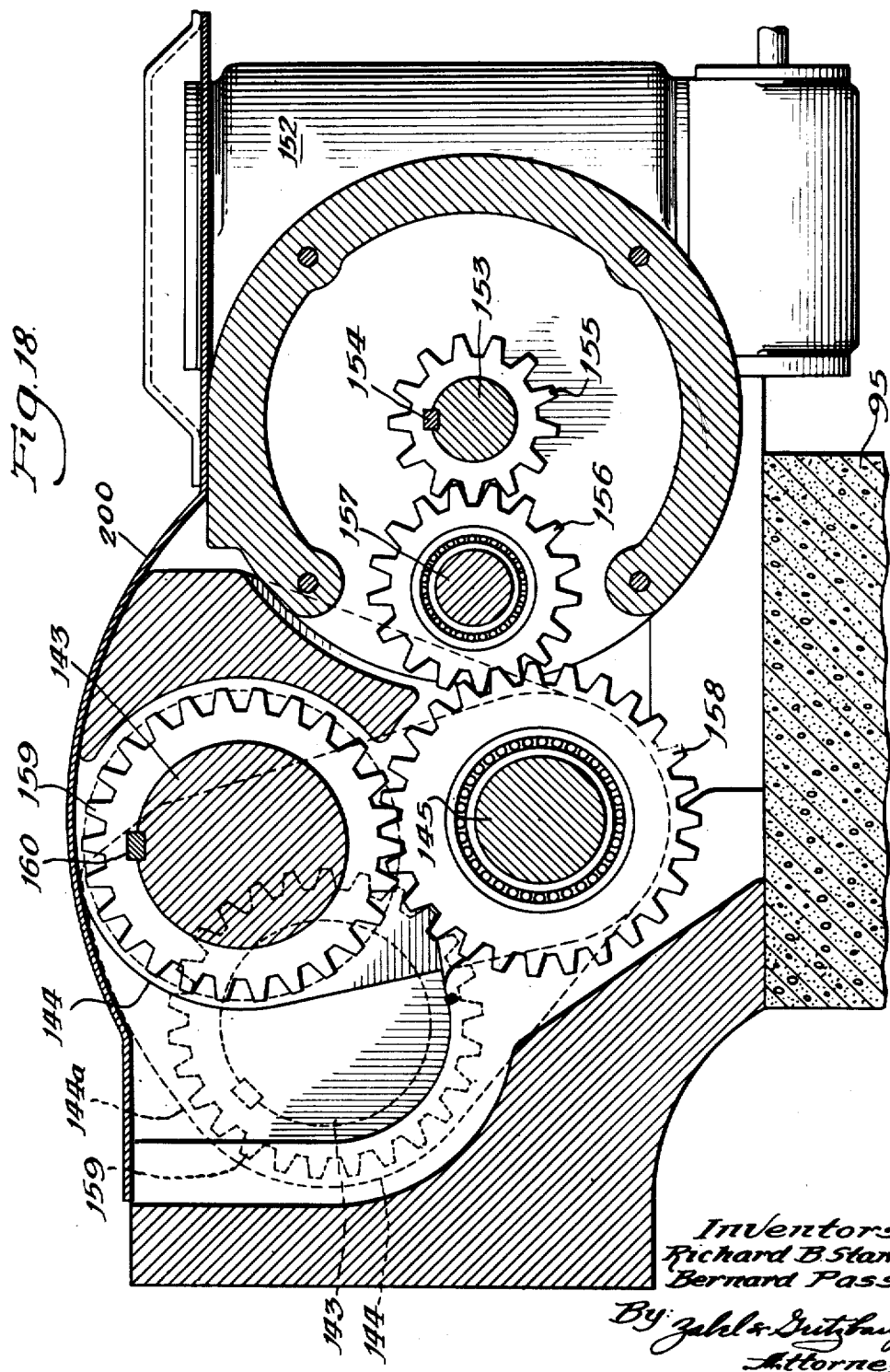

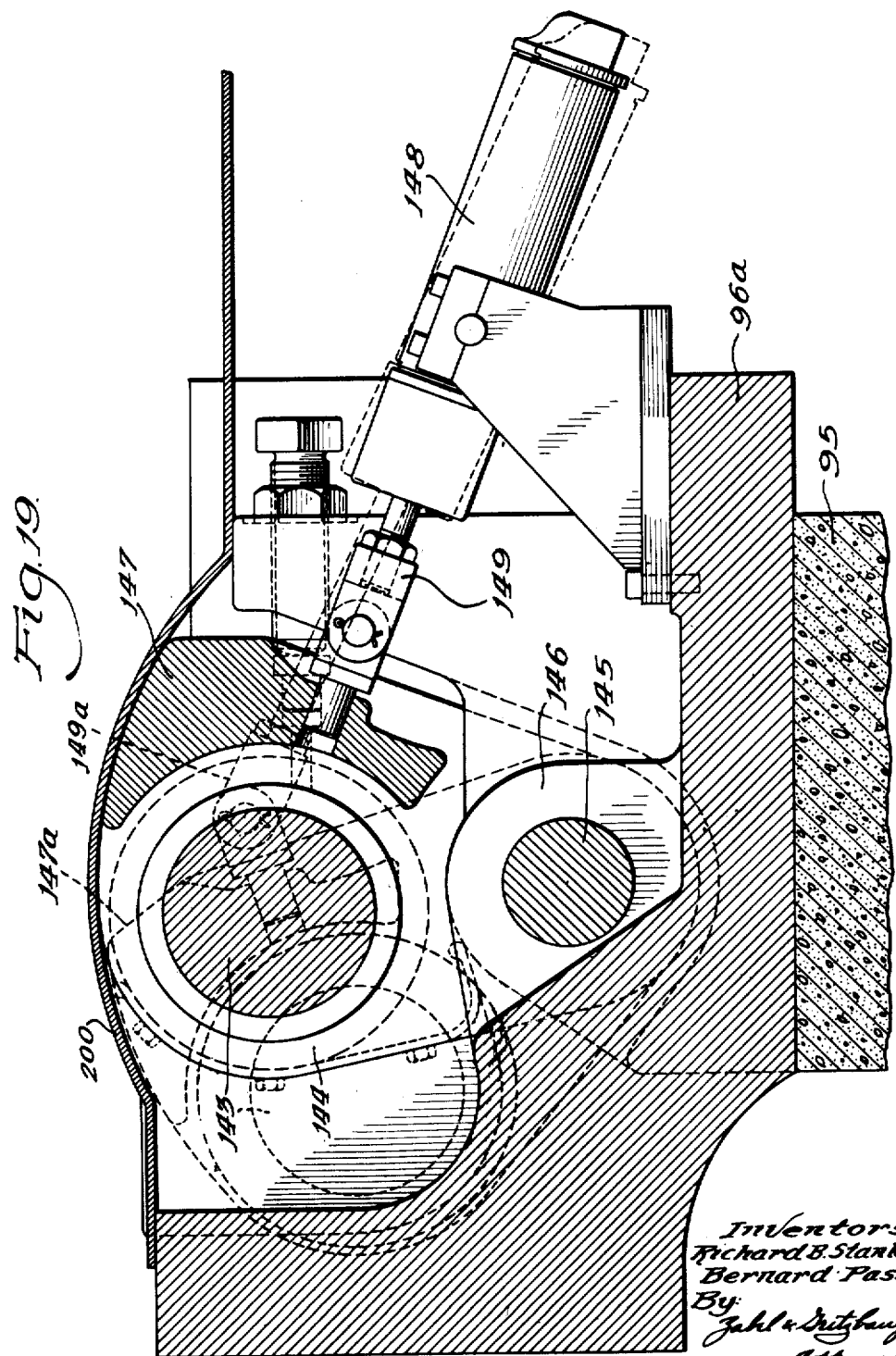

Dec. 23, 1952 R. B. STANLEY ET AL 2,622,378
WHEEL SUPPORTING AND ROTATING DEVICE
Filed July 10, 1948 18 Sheets-Sheet 15
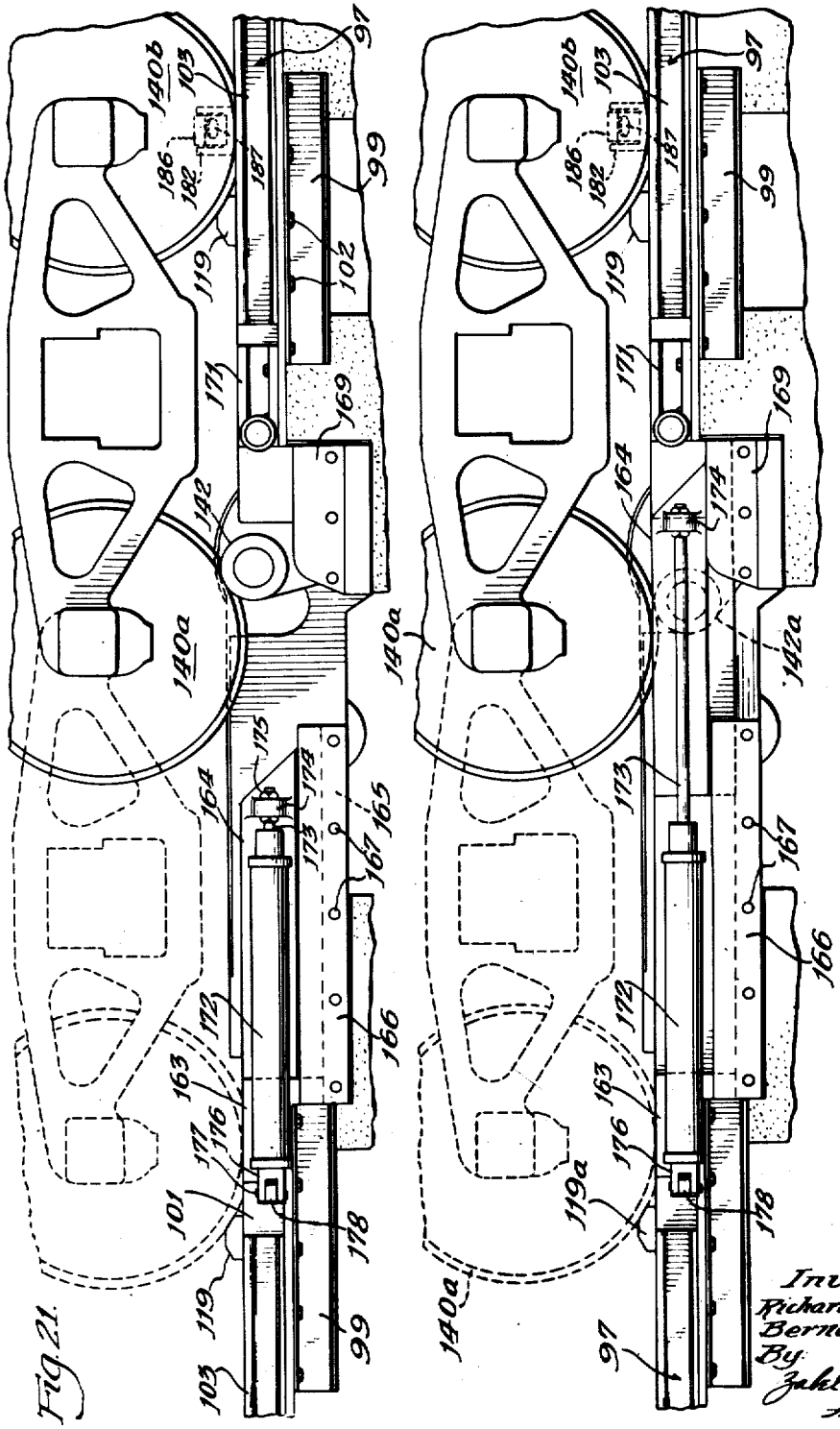

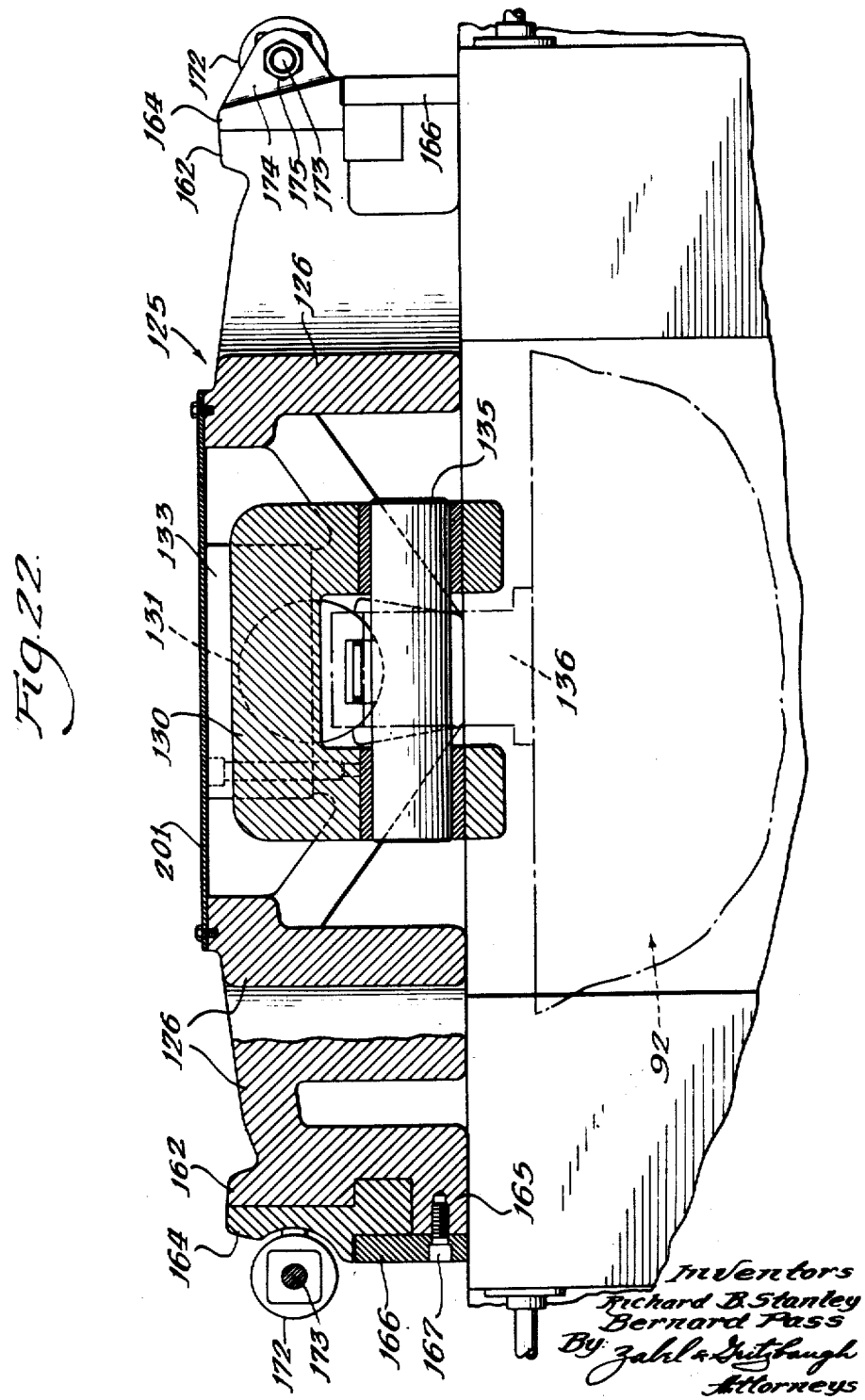

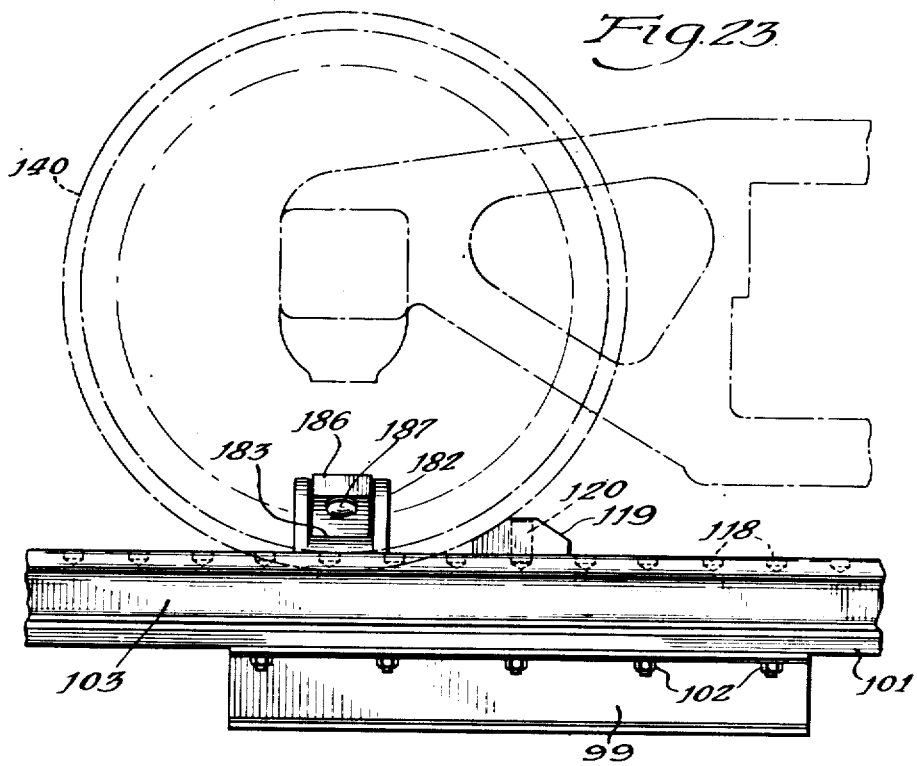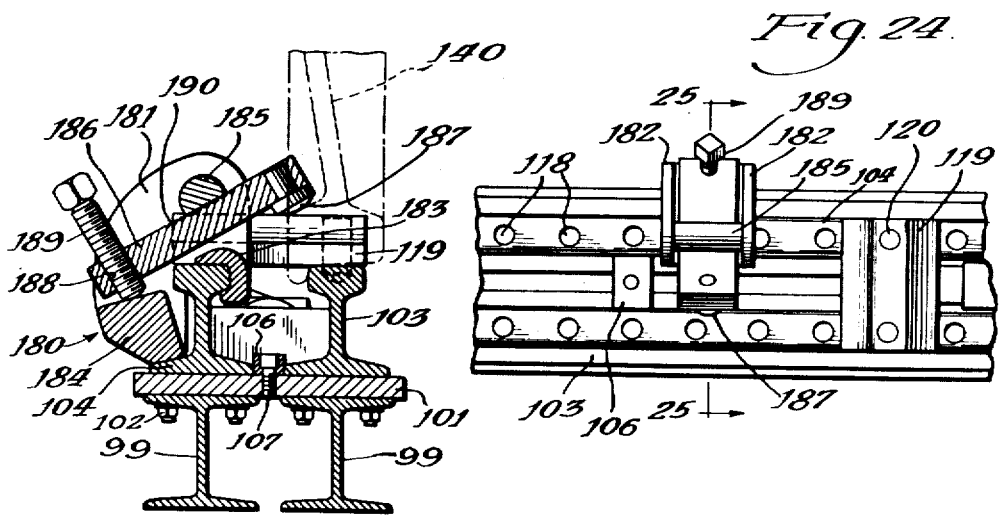

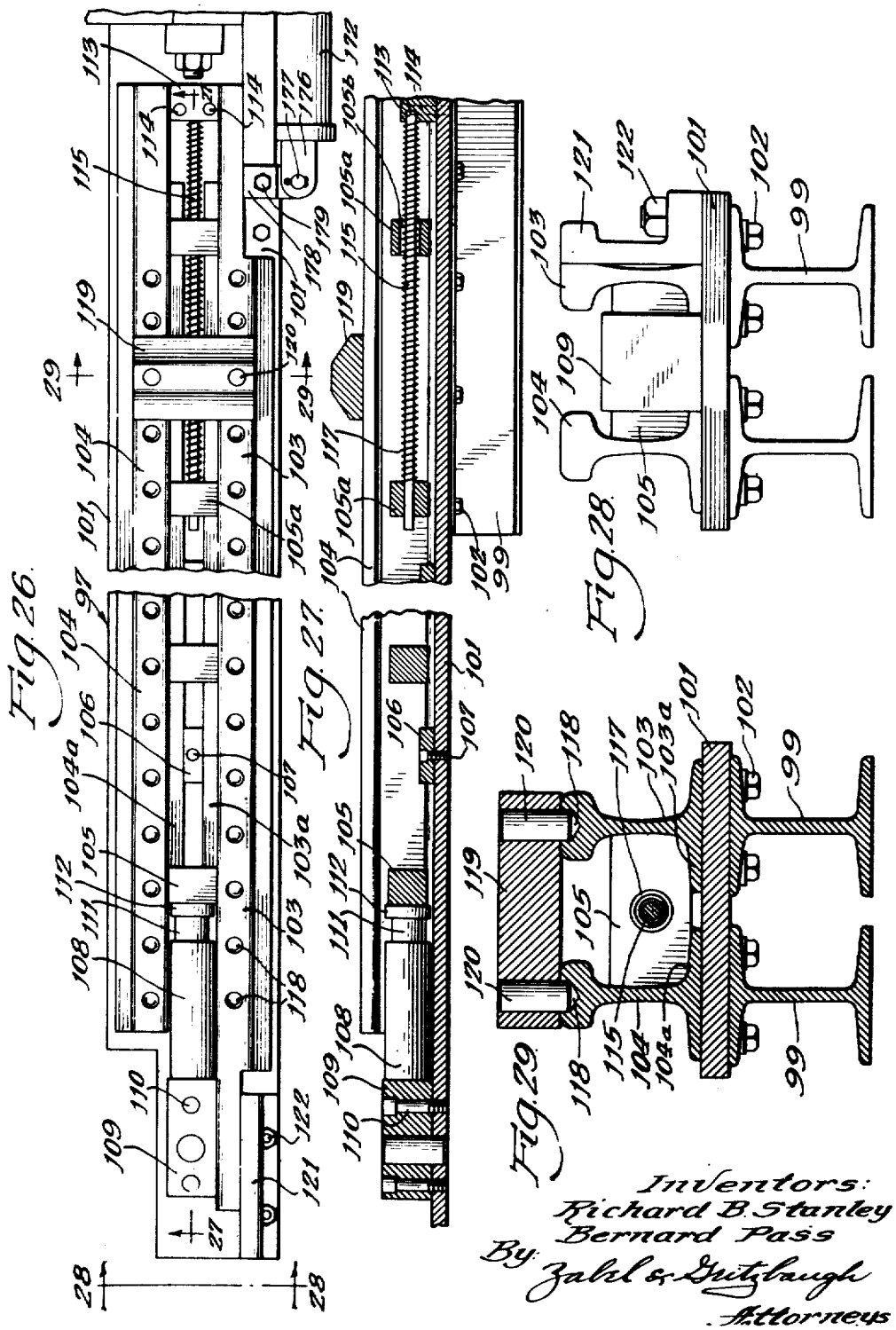

Patented Dec. 23, 1952

2,622,378

UNITED STATES PATENT OFFICE 2,622,378

WHEEL SUPPORTING AND ROTATING DEVICE

Richard B. Stanley, Park Ridge, and Bernard Pass, Maywood, Ill., assignors to Alpha Engineering & Machine Works, Inc., Chicago, Ill., a corporation of Illinois Application July 16, 1948, Serial No. 38,156

30 Claims. (Cl. 51—236)

The present invention is concerned with truing machines for use in refinishing vehicle wheels, particularly on railroad cars of both the passenger and freight type, street cars and the like.

Railroad car wheels are subject to considerable abuse during normal use particularly due to the alternate heating and cooling caused by the application of the brakes and to the skidding of the wheels along the tracks when the brakes are applied for emergency stops. This alternate heating and cooling of the wheel treads often result in the spalling off of metal, creating surface irregularities of the tread and flange of the wheel that must be repaired. Frequently due to emergency stops "flats" result from the skidding of the wheels and these too must be remedied in order to preserve proper riding qualities in the vehicle. Wheels often become more or less egg shape due to uneven wear conditions and when this occurs such wheels must be trued to restore their roundness.

In a co-pending application of one of the present inventors now abandoned, bearing Serial No. 678,138, filed June 20, 1946, a wheel truing device is disclosed that is used for machining or grinding faulty wheels so as to return them to their serviceable condition. With a machine of the type shown in this copending application, however, some means must be provided for rotating the wheel during the truing operation in order to feed the work into the machine tool or grinder. The present invention is intended to provide such a device that both supports and rotates the car wheels while they are being trued.

The vehicle or car having the faulty wheel or pair of wheels is pulled or pushed onto the present device by means of a locomotive or some other suitable powered means and when the car is located with its faulty wheel or pair of wheels in their proper places for the truing operation to be performed the car is brought to rest. Without requiring any jacking up of the car, portions of the present device are moved aside to make room for application of the truing device to the faulty wheels. Without any further adjustments or operations the wheels to be trued are properly supported for rotation and the truing operation can be commenced.

Thus it is an object of the present invention to provide a simple, yet effective support and drive for car wheels that are to be trued while the wheels remain under the vehicle or car. This is done with the present invention in a very short time without requiring the car to be jacked up as has been the case in previous devices.

During the truing operation a cutter or grinder is applied to the wheel tread and flange and considerable force is applied against the wheel. Under these circumstances there is a definite tendency for the wheels thus being trued to slip with relation to the means rotating the wheels and for this reason it is necessary to provide adequate friction between the wheels and the driving means. This is accomplished with the present invention by virtue of the fact that the wheels that are being trued are supported on a single roller with merely a line contact between each wheel and its respective roller. In this manner the entire weight supported by the wheel is utilized as a downward force to increase the friction between such wheel and its respective driving member.

In the second embodiment of the present invention the car wheels that are being trued are mounted eccentrically on the supporting and driving rollers and, therefore, an additional traction force is provided by virtue of the moment arm produced by the eccentric loading.

Still another object of the invention is to provide rigidity to the wheels that are being trued so that during the truing operation the machine tool is working against a rigid workpiece.

Additional objects and advantages will be hereinafter set forth and will become apparent from a reading of the following description and the drawings, in which Fig. 1 is a plan view of a pit with a railroad track leading to and from the pit and showing one embodiment of the present invention mounted over the pit;

Fig. 6 is an enlarged, vertical, transverse, sectional view taken through the wheel supporting rollers, the view being taken on the line 6—6 of Fig. 1, a portion of the device being shown in elevation and further illustrating a wheeled axle mounted in place on the device;

Fig. 9 is a sectional view corresponding to Fig. 2 but illustrating a truing device mounted in place on a car truck in its proper relationship with respect to the wheel supporting and rotating device forming the subject matter of the present invention;

Fig. 10 is a vertical, transverse, sectional view through the wheel supporting and rotating device and the pit therebetween and illustrating in end elevation the wheel truing device shown in Fig. 9 looking in a direction from left to right;

Fig. 11 is an enlarged, vertical, fragmentary, sectional view through one of the wheel blocking devices, the view being taken along the line 11—11 of Fig. 9;

Fig. 12 is plan view of a pit with a railroad track leading to and from the pit and showing a second embodiment of the present invention, and further showing a modified truing device mounted in place in the pit;

Fig. 13 is an enlarged, fragmentary plan view of the pit and track arrangement illustrated in Fig. 12 with the truing device removed and with a portion of the cover plates over the pit broken away to illustrate one of the supporting and driving wheels of the drive therefor;

Fig. 14 is an enlarged, transverse, sectional view through the pit taken on the line 14—14 of Fig. 12;

Fig. 15 is an enlarged, longitudinal, sectional view taken through the pit, the view being taken along the line 15—15 of Fig. 12;

Fig. 16 is an enlarged, transverse, sectional view, the view being taken along the line 16—16 of Fig. 13;

Fig. 17 is an enlarged, longitudinal sectional view taken through the wheel supporting and driving wheel assembly, the view being taken along the line 17—17 of Fig. 13;

Fig. 18 is an enlarged, transverse, sectional view taken through the wheel supporting and driving assembly, the view being taken along the line 18—18 of Fig. 13;

Fig. 19 is a transverse, sectional view taken through the wheel supporting and driving assembly, the view being taken along the line 19—19 of Fig. 13;

Fig. 20 is an enlarged, fragmentary side elevational view of the track assembly over the pit illustrating a railway car truck mounted in place directly over the supporting and rotating wheel but prior to removal of the sliding track segment, and further showing the supporting and rotating wheel disposed in its lowered position;

Fig. 21 is a view corresponding to Fig. 20 but illustrating the supporting and rotating wheel in its elevated position and the movable track segment wtihdrawn;

Fig. 22 is an enlarged, transverse, sectional view taken through the track assembly over the pit and particularly illustrating the stationary support for the truing machine, the view being taken along the line 22—22 of Fig. 13;

Fig. 23 is an enlarged, side elevational view of a segment of the track illustrating the locking or hold-down clamp for one of the car wheels;

Fig. 24 is a plan view of the hold-down clamp shown in Fig. 23;

Fig. 25 is a transverse sectional view taken through the hold-down clamp and track assembly illustrated in Figs. 23 and 24, the view being taken along the line 25—25 of Fig. 24;

Fig. 26 is an enlarged, plan view of one of the sliding track segments that is mounted over the pit, a portion of the track segment being broken away;

Fig. 27 is a longitudinal, sectional view taken through the track segment, the view being taken along the line 27—27 of Fig. 26;

Fig. 28 is an enlarged, end elevational view of the track segment illustrated in Fig. 26 taken in the direction illustrated by the arrows 28—28 of Fig. 26; and Fig. 29 is an enlarged transverse, sectional view taken through the track segment, the view being taken along the line 29—29 of Fig. 26.

For purposes of illustration two specific embodiments of the present invention have been selected and will be described hereinafter, but it is recognized that numerous modifications may be made without departing from the intended scope and spirit of the invention.

This application is a continuation in part of the applicants' co-pending application, now abandoned, bearing Serial No. 765,676, filed August 2, 1947, entitled "Wheel Supporting and Rotating Devices."

Referring to Figs. 1 to 11 inclusive of the drawings one embodiment of the present invention is illustrated in the form of a wheel supporting and rotating device shown generally at 15 mounted over a pit 16. Conventional railroad track rails 17 mounted on ties 18 are disposed at the opposite ends of the pit 16 but terminate at the edge of the pit. The pit as shown is in the shape of a cross providing laterally spaced pit portions 16a providing adequate room for the truing device hereinafter described and personnel operating the truing device.

Figure 4:
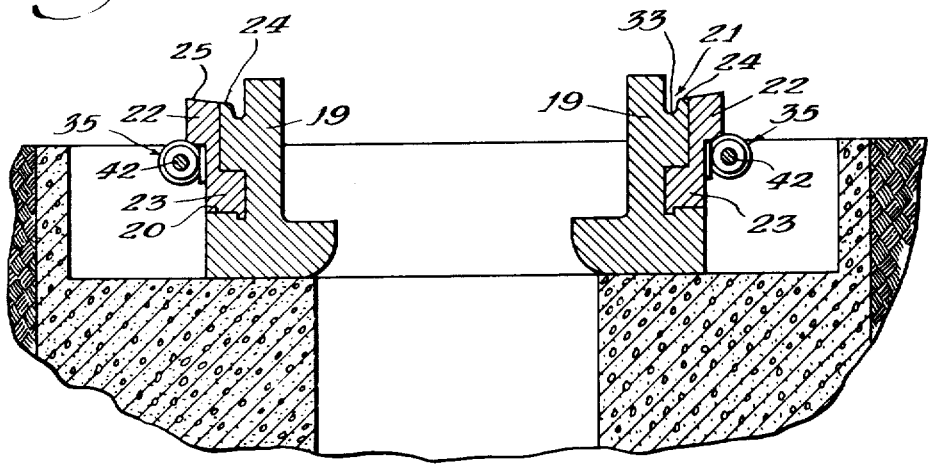
Fig. 4 is a vertical, transverse, sectional view through the present device, the view being taken along the line 4—4 of Fig. 2.
Figure 5:
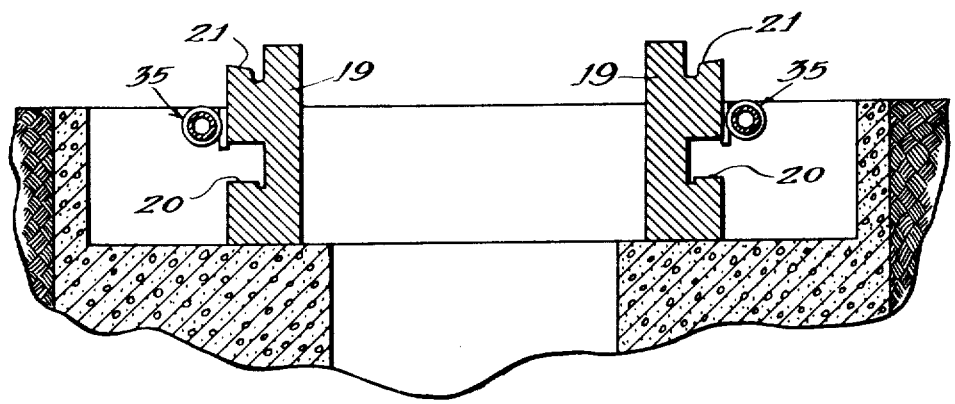
Fig. 5 is a transverse, sectional view through the device, the view being taken along the line 5—5 of Fig. 2.
Figure 2:
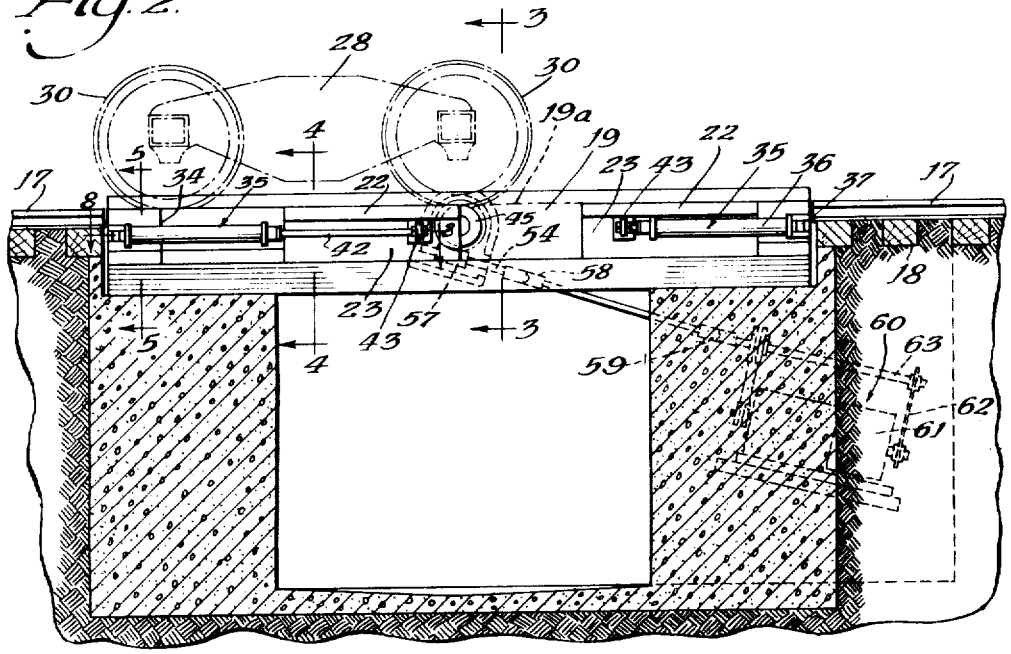
Fig. 2 is a longitudinal, sectional view of the device shown in Fig. 1 with a railroad car truck illustrated in broken lines in position on the device forming the subject matter of the present invention.

Referring now particularly to Figs. 1 to 5 inclusive the wheel supporting and rotating device 15 includes a pair of horizontally spaced parallel rail members 19 that constitute in effect beams spanning the length of the pit 16 in the region between the ends of track rails 17. Each of these beams or rail members 19 is provided on its outer face throughout most of its length with a longitudinally extending cut-out or grooved portion 20 (see Figs. 4 and 5) that is disposed intermediate the lower and upper edges of the rail member and an upper cut-out portion 21 that likewise extends in a longitudinal direction throughout substantially the length of the rail member. As shown in Figs. 1, 2 and 4 rail segments 22 each provided with an interfitting flange portion 23 are supported on the outer face of each of the rail members 19 with the flange portion 23 locked in the longitudinal cut-out portion 20. As shown in Fig. 2 there are two such rail segments 22 mounted on each of the rail members 19 and both of these rail segments 22 are adapted to slide along its respective rail member 19 in a longitudinal direction with respect to the rail member.

Figure 3:
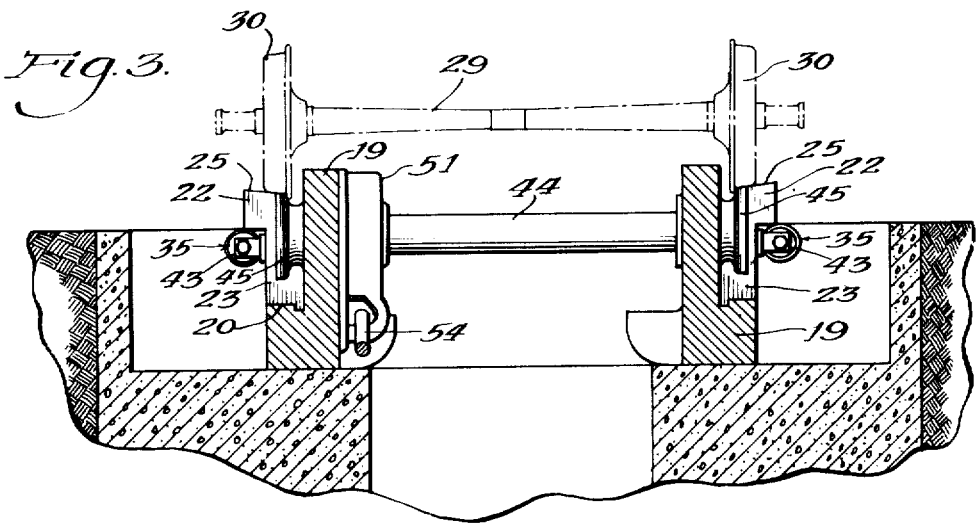
Fig. 3 is a vertical, transverse, sectional view taken through the device, the view being taken along the line 3—3 of Fig. 2.
Figure 7:
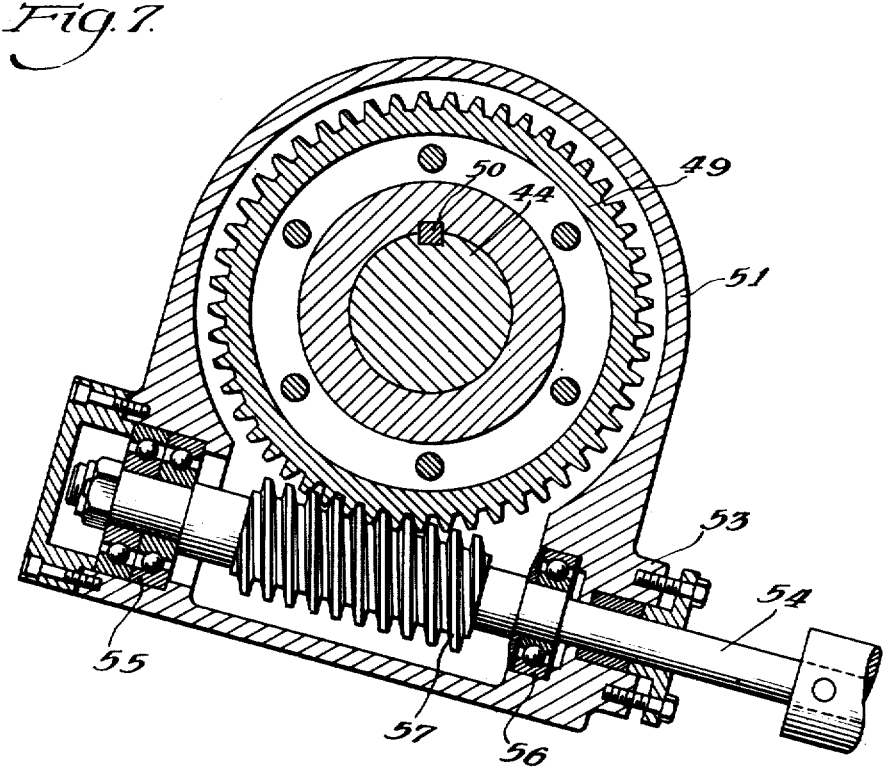
Fig. 7 is an enlarged, vertical, longitudinal, sectional view through the supporting wheel rotating mechanism, the view being taken on the line 7—7 of Fig. 6.

As shown in Figs. 3 and 6 the cut-out or notched portion 21 that is disposed along the upper outer edge of each of the rail members 19 provides a rail tread 24 along the rail member and the upper surface or edge 25 of the rail segments 22 provides continuations of the tread portion 24 so that these two tread portions 24 and 25 serve as track rails over which wheeled vehicles may pass. Such a wheeled vehicle is illustrated in Fig. 9 at 20 and comprises a vehicle or car body 27 mounted on vehicle or car trucks, one of which is shown at 28. Each of these trucks 28 is provided with a pair of car axles, one of which is illustrated at 29 in Fig. 3 and a pair of flanged wheels 30 is mounted in the usual manner on each axle 29. Each wheel 30 as shown has a conventional car wheel having a tread portion 31 and a flange 32. Thus the cut-out portion 21 (Fig. 4) in which rail member 19 is provided not only with the track tread portion 24 but also includes a depressed or grooved portion 33 for receiving the flange 32 of the wheel 30 as shown in Figs. 3 and 6.

Each of the rail segments 22 as previously mentioned is adapted to slide lengthwise along its corresponding rail member 19 from a position adjacent to the center of the rail member where the two rail segments 22 adjoin or are disposed in abutting relationship to a position adjacent the corresponding end of the rail member 19. As shown in Fig. 1 a shoulder 34 is provided adjacent each end of each rail member 19 against which shoulder the adjacent rail segment 22 abuts for limiting the movement of such rail segment toward the free end of the rail member 19.

Figure 8:
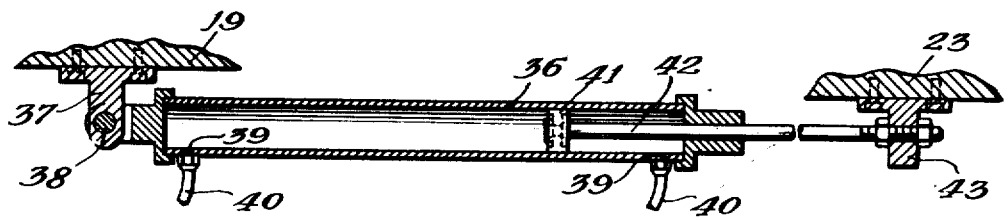
Fig. 8 is an enlarged, horizontal, sectional view taken through the cylinder and track segment connections illustrated in Fig. 1.

Disposed alongside each rail segment 22 is a horizontally extending actuating unit generally indicated at 35 that comprises a cylinder 36 (see Fig. 8) fixed at one end to the rail member 19 by means of a suitable bracket 37 that has bifurcated arms to which the cylinder 36 is attached by means of a pin 38. A fluid port 39 is provided at each end of the cylinder 36 and a suitable fluid medium such as liquid or gas is introduced through the ports 39 through conduits 40. Mounted for reciprocating movement in the cylinder 36 is a piston 41 having a plunger or connecting rod 42 attached thereto and this connecting rod 42 projects through the end wall of the cylinder 36 and extends to a position adjacent the inner end of the corresponding rail segment 22. The free end of the connecting rod 42 is attached to the rail segment 22 by means of a suitable bracket 43 as best illustrated in Fig. 8. Thus upon introduction of air or a hydraulic fluid first through one of the conduits 40, piston 41 is moved in one direction in the cylinder 36 and upon reversal of flow of the actuating fluid the piston 41 is moved in the opposite direction. In this manner each of the rail segments 22 is moved along its corresponding rail member 19. Initially it can be assumed that both rail segments 22 are disposed in abutting relationship as illustrated in Fig. 2 in broken lines 19r. One or both of the rail segments can be moved away from this central or abutting position by operation of the appropriate actuating unit or units 35.

Referring now to Figs. 1, 2, 3 and 6 a shaft 44 is disposed transversely between the rail members 19 and projects through the rail members as best shown in Fig. 6. This shaft may be journalled in the rail members in any suitable manner. Mounted on each end of the shaft 44 is a car wheel supporting roller 45 that is fixed to rotate with the shaft in any suitable manner. Thus each roller 45 is disposed adjacent to the outside face of the corresponding rail member 19 and in each instance the rail member 19 is entirely cut away as at 46 in Fig. 6 to accommodate the roller. Each roller 45 is provided with a peripheral tread portion 47 that is adapted to support the tread portion 30 of a car wheel and is grooved inwardly as at 48 to provide clearance for the flange 32 of the car wheel. Thus railroad car wheels 30 (Fig. 6) mounted on an axle 29 may be supported directly upon the peripheral surface of the supporting rollers 45.

The shaft 44 is rotatably mounted so as to rotate the supporting rollers 45. As best shown in Fig. 6 a gear 49 is mounted adjacent to one end of the shaft 44 adjacent to the inner face of one of the rail members 19 and a key 50 disposed in keyways in the gear 49 and the shaft 44 may be utilized to fix the gear 49 with respect to the shaft 44. A housing 51 surrounds the gear 49 and is fastened to the rail member 19 by means of suitable screws or the like 52. The housing 51 is provided with a downwardly projecting wall portion 53 that is apertured to receive a shaft 54 (see Figs. 2, 6 and 7) that extends throughout the width of the housing and projects through the wall 53. This shaft 54 is mounted in bearings generally indicated at 55 and 56 at the opposite sides of the housing 51 and as shown these bearings are of the ball bearing type. Mounted on the shaft 54 is a worm gear 57 that meshes with the gear 49 so that upon rotation of the shaft 54 the shaft 44 is rotated through the interaction between the worm gear 57 and the gear 49. Suitable bushings and the like may be provided about the shaft 54 in the wall 53.

As best shown in Fig. 2 the shaft 54 leaving the housing 51 extends to a universal coupling or connection 58 and then to a second universal coupling or connection 59 where it is connected to a suitable motor drive generally indicated at 60. This motor drive 60 may be of any conventional type including a motor 61 having a sprocket and chain or belt drive 62 extending to a shaft 63 that is connected through the universal couplings 58 and 59 to shaft 54. Thus by rotation of the shaft 63 from the motor drive 60 the shaft 44 is powered so as to rotate the car wheel supporting rollers 45. Since the car wheels 30 are mounted on the supporting rollers 45 the rotation of the rollers 45 is transmitted to the car wheels 30. Thus there is provided a drive for rotating the car wheels 30.

In the embodiment of the invention just described the car wheels being trued are disposed directly on top of the supporting and rotating wheels and the truing machine is mounted so that each cutter or grinding tool engages the periphery of its respective car wheel at an offset position with respect to the vertical diameter of the wheel. Under some circumstances, particularly in connection with certain passenger car and locomotive equipment, the brake rigging and other accessories utilize at least some of the space that would be needed for the cutting tool if the tool were to be disposed against the car wheel in the manner illustrated in this first embodiment of the invention. It, therefore, may be necessary to apply the cutter or grinding tool directly to the bottom face of the car wheel to be trued. Such an arrangement is possible with the device illustrated in the second embodiment of the present invention.

Referring now to Figs. 12 to 14 inclusive the second embodiment of the invention is illustrated in connection with a pit generally indicated at 80 that is generally in the shape of a cross and is provided with different elevations. As best shown in Fig. 12 there are four sets of stairways generally indicated respectively at 81, 82, 83 and 84, each of which sets comprises an upper stairway 85 and a lower stairway 86 separated by an intermediate landing 87. Disposed to one side of the intermediate landing 87 in each instance is an intermediate platform 88 that is on a common elevation with the adjacent landing 87. The stairway 85 in each instance serves as an upper stairway leading from the ground level indicated at 89 in Fig. 12 to the intermediate landing 87 and hence to the intermediate platform 88. The stairway 86 in each instance serves as a lower stairway leading from the adjacent intermediate landing 87 to a lower intermediate platform 90, there being two of these lower intermediate platforms 90, one being disposed on each side of a lowermost pit portion 91 that extends throughout the entire width of the pit 80. This lowermost pit portion 91 serves to accommodate a wheel truing machine generally indicated at 92 and each of the lower and upper intermediate platforms 90 and 88 respectively are disposed alongside parts of the wheel truing machine 92.

Each of the upper intermediate platforms 88 extends from one outer side of the pit 80 to a position short of the center of the pit and terminates at an upstanding wall or post, two of which are shown at 93 in Fig. 12 and the other two are shown at 94 in Fig. 16. The posts 94 are connected transversely to the pit by a bearing wall indicated at 95 in Figs. 15 and 16.

Mounted on this bearing wall 95 is a supporting and rotating wheel assembly generally indicated at 96 in Figs. 13 and 17 that is disposed transversely of the pit in the upper region thereof. Extending in a longitudinal direction over the pit 80 in both directions away from the supporting and rotating wheel assembly 96 are track segment assemblies generally indicated at 97, at the free end of each of which are mounted conventional track rails 98. The track rails 98 are disposed directly on the ground adjacent to the pit 80 while the track assemblies 97 are mounted on I-beams 99 (see Figs. 15 and 16) and on a concrete supporting structure or foundation indicated at 100. The I-beams 99 span the open portions of the pit and are supported on the foundation 100 and posts 94 and 93 as the case may be.

Each of the track assemblies 97 as best shown in Figs. 12, 15 and 26 to 29 inclusive comprises a fixed plate 101 that is bolted or otherwise secured as at 102 (Figs. 28 and 29) to the I-beam or beams 99 on each of which plate 101 are mounted a pair of spaced rails 103, 104, rails 103 serving as an outer rail and rail 104 as an inner rail. These spaced rails 103 and 104 in each instance are joined together in fixed relationship by means of a plurality of spacers 105 so that these two rails 103 and 104 operate together as a unit. As will be best shown in Figs. 28 and 29 these rails 103 and 104 are mounted directly on top of the plate 101 and are adapted to slide as a unit on this plate in a longitudinal direction. A key 106 is screwed as at 107 (see Fig. 26 and 27) to the plate 101 but projects upwardly between the inner flanges 103a and 104a respectively of rail 103 and 104. This key 106 engages the inside edges of both of the rail flanges 103a and 104a and serves to prevent lateral movement of the rails but guides the rails in their longitudinal movement on the plate 101.

Again referring to Figs. 26 and 27 a hydraulic jack 108 is mounted on one end of each of the plates 101 and is backed by a stationary block 109 that is screwed as at 110 directly onto the plate 101. This hydraulic jack 108 is provided with a movable ram or plunger 111 that is provided on its free end with a jacking pad 112 that rests against the adjacent spacer 105. Thus the hydraulic jack 108 is adapted to apply a sliding force against the adjacent spacer 105 so as to move the spaced rails 103 and 104 as a unit in a longitudinal direction along the spacer 105. Disposed at the opposite end of the rail assembly is a fixed block 113 that is screwed as at 114 onto the plate 101 and extending outwardly from the block 113 is a horizontally disposed rod 115 that is adapted to carry concentrically therearound a compression spring 117. The adjacent spacers 105a are apertured as at 105b to receive the rod 115 and as the rail assembly slides along the plate 101 these spacers 105a and 105b slide along the stationary or fixed rod 115. As is best shown in Figs. 26 and 27 the compression spring 117 is seated between the fixed block 113 and spacer 105a and is compressed therebetween when the rail assembly moves in a direction from left to right as viewed in these two figures. When the force of the hydraulic jack 108 is released the compression spring 117 returns the rail assembly to the initial position shown for example in Figs. 1, 13 and 26.

Each of the rails 103 and 104 is provided with a plurality of slots 118 spaced throughout the length of each rail. A removable wheel block or wedge member 119 spans the distance across the spaced rails 103 and 104 and is provided with spaced pins 120 (Fig. 29) that project below the lower face of the wheel block 119. These pins 120 are so spaced and formed that they project into and substantially fill the slots 118 in the tops of the spaced rails 103 and 104 when the wheel block is properly placed on these rails.

As best shown in Fig. 12 each of the outer rails 103 is so disposed with respect to the adjacent fixed track rail 98 that the inner edge 103b is in alignment with the inner edge 98a of the adjacent track rail. Thus as a railroad car passes from the fixed track 98 with the flanges of the wheels of the car truck disposed adjacent to the inner edges 98a of the rail onto the rail assembly 97 the flanges of the wheels are disposed adjacent to the inner edges 103b of the rails 103. While the car is thus passing from the fixed rails 98 onto the rail assembly 97, the wheels first pass over a fixed track segment 121 that is bolted as at 122 (Fig. 26) onto the plate 101. As can best be seen in Figs. 12 and 26 the outer rail 103 slides back and forth along the inner face of the fixed rail segment 121 during sliding movement of the rail assembly 97. This fixed rail segment 121 is of a length sufficient to close the gap between the fixed track 98 and the sliding rail 103 irrespective of the position of the sliding rail 103.

Again referring to Figs. 12 and 13 a machine supporting frame generally indicated at 125 is mounted over the central portion of the pit directly on top of the four spaced posts 93 and 94. This frame 125 comprises a pair of spaced side frame members 126 that are disposed longitudinally with respect to the pit 80 connected by end cross frame members 127 and 128 and an intermediate cross frame member 129. A wheel truing machine is suspended from this frame 125 by means of a yoke 130 that is provided with a shaft extending outwardly from both sides thereof to form shaft segments 131 and 132, which in turn are mounted to rotate and slide laterally in bearing blocks 133 and 134 respectively. These bearing blocks 133 and 134 are supported respectively on the intermediate cross frame member 129 and the end cross frame member 128.

For purposes of illustration a wheel truing machine is shown generally at 92 in Figs. 13, 14 and 22 and is suspended from the yoke 130 by means of a pin 135 that is journalled to rotate and slide laterally in the yoke 130 and is fixed with respect to a suspension shaft 136 that forms part of the truing machine 92.

The details of the truing machine 92 form no part of the present invention and it will, therefore, be sufficient to state that the truing machine merely comprises a C-frame generally indicated at 137 in Fig. 14 that is provided with spaced centers generally indicated at 138 that are adapted to be fixed to the centers of the car wheel axle 139 that supports the wheels 140 that are to be trued. These spaced centers 138 are adjustable and when the truing machine is ready for operation they are fixed with respect to the longitudinal center line of the car axle 139. The centers 138 are slidable in a horizontal direction in and out of a cylinder 123 so that the centers can be withdrawn away from the ends of the axle 139. Each of the cylinders 123 in turn is movable up and down in a vertically disposed cylinder 124 so that cylinders 123 together with the centers 138 may be lowered to an out-of-the-way position.

The C-frame is further provided on each of its spaced arms 137a with a cutter or grinding tool indicated at 141 that is mounted for rotation on the C-frame 137. As can be seen from Figs. 12 and 14 each of the cutter or grinding tools 141 is disposed below the adjacent centers 138 so that when the truing machine 92 is mounted for use on a pair of car wheels 140 the cutter or grinding tool 141 is brought against the lower face of the car wheel at the lower end of the vertical diameter through the wheel. Thus in this instance it is necessary to support the car wheels 140 at some position other than directly below the vertical diameter through the wheels as was the case in the first embodiment of the invention. As previously mentioned and as can be observed from Fig. 12 the truing machine 92 is mounted in and projects above the deepest portion 91 of the pit 88.

Disposed to one side of this deepest portion 91 of the pit 88 and mounted directly on top of the foundation wall 95 (see Figs. 12, 13, 16 and 17) is the supporting and rotating wheel assembly 96 that includes a base 96a. This assembly comprises a pair of spaced supporting and rotating wheels or rollers 142 that are mounted as by threading as at 142a onto the opposite ends of a rotatable shaft 143. This shaft 143 is in turn journalled in a frame generally indicated at 143a that includes a pair of spaced swinging bearing arms 144, one of which arms 144 is disposed adjacent to each of the opposite ends of the shaft 143. The lower end of each of the swinging bearing arms 144 is apertured and is mounted on a supporting shaft 145, which shaft in turn is mounted in spaced upstanding wall portions 146 of the base 96a. The swinging bearing arms 144 are adapted to swing from an upright position shown in solid lines in Fig. 18 to a lowered position indicated in broken lines 144a, during which movement the supporting and rotating wheels 142 move from an upright position shown in solid lines in Fig. 21 to a lowered or inoperative position shown in broken lines 142a in Fig. 20. When the supporting and rotating wheels 142 are in their upright position shown in Fig. 21, they project above the adjacent rail 103, whereas when the supporting and rotating wheels 142 are in their lowered or inoperative position, they are disposed with their upper edges flush with or slightly below the upper edges of the adjacent rails 103.

Again referring to Figs. 13 and 17 to 19 inclusive a frame 143a also includes a cross brace 147 that connects the spaced swinging bearing arms 144 and as is best shown in Figs. 13 and 19 a hydraulic cylinder or jack 148 is provided with a plunger 149 that engages the cross member 147. Thus the swinging movement of the swinging bearing arms 144 is brought about by operation of the hydraulic jack 148 operating as it does against the cross member 147 to move the cross member 147 together with the swinging bearing arms 144 from the solid line position shown at 147 in Fig. 19 to the broken line position 147a.

Referring now to Fig. 13, motor 150 is provided for rotating the shaft 143 and operates by means of a belt and pulley assembly generally indicated at 151 through a speed reducer 152 to rotate a shaft 153 as best shown in Figs. 13 and 18. Keyed to this shaft 153 as at 154 is a pinion 155 that drives an idler or intermediate gear 156 that is mounted on a shaft 157. This intermediate gear 156 in turn drives a gear 158 that is mounted to rotate on shaft 145 (see Figs. 17 and 18). Gear 158 in turn is adapted to drive the gear 159 that is keyed as at 160 to the shaft 143, on the opposite ends of which latter shaft are mounted the supporting and rotating wheels 142. Thus the supporting and rotating wheels 142 are powered by the motor 150 through the drive mechanism just described.

Referring to Figs. 12 and 13 it is to be noted that each of the spaced side frame members 126 of the frame 125 is cut out as at 161 to provide clearance for the cutter 141 (see Fig. 12) and other portions of the wheel truing machine 92. On the outer edge of each of the side frame portions 126 of frame 125 is disposed a stationary rail segment 162 that is aligned with the outer rails 103 of rail assemblies 97. As is best shown in Figs. 12 and 13, when the rail assemblies 97 that are located adjacent to the left hand end as viewed in Fig. 13 of the frame 125 are disposed in their normal position, there is a space between the end of movable rail 103 and stationary rail segment 162. A fixed rail segment 163 spans this space so that as a railroad car moves from rail 103 onto fixed rail segment 162 it traverses fixed rail segment 163.

Mounted adjacent to the outer edge of the stationary rail segment 162 is a sliding rail segment 164 that is mounted to slide on an outwardly projecting flange 165 (Fig. 22) that forms part of each spaced frame member 126. Retaining plate 166 is screwed as at 167 to the flange 165 and projects upwardly above the flange to hold the sliding rail segment 164 in place and also serves to guide the sliding rail segment in its movement in a longitudinal direction with respect to the pit 88. This sliding rail segment 164 is adapted to slide from the position shown in Figs. 13 and 21 to a position shown at 164 in Fig. 20 where it spans or closes the clearance area formed by the cut-out portion 161 in each of the side frame members 126. Disposed directly adjacent to each of the supporting and rotating wheels 142 is a rail supporting member 168 that is adapted to support the free end of the sliding rail segment 164 when the latter is disposed in the position shown in Fig. 20. A retaining plate 169 is fixed to the supporting member 168 and projects thereabove so as to prevent lateral movement of the free end of sliding rail segment 164 when the latter is disposed in the position shown in Fig. 20.

When the sliding rail segment 164 is in the position shown in Fig. 20, the inner edge 164a (see Fig. 13) is disposed closely adjacent to the side face of the corresponding supporting and rotating wheel 142 and the upper edge of the sliding rail segment 164 is disposed in the same plane as the upper edge of rails 103. Thus when the supporting and rotating wheels 142 are disposed in their lowered or inoperative position previously described, the upper edge of each wheel is disposed flush with or slightly below the upper edge of sliding rail segment 164 so that when the sliding rail segment is in its spanning position illustrated in Fig. 20, a railway car may roll over the rollers 142 without engaging the rollers.

Again referring to Fig. 13 a fixed rail segment 170 is disposed adjacent to the end of each supporting and rotating wheel 142 with its inner edge 170a disposed in the same vertical plane with the inner edge 103a of the adjacent rail 103. Between the fixed rail segment 170 and the adjacent rail 103 is a fixed rail segment 171. Thus when it is desired to pass a car or train of cars over the pit, the truing machine 92 is lowered with its parts otherwise moved to an out-of-the-way position so that the sliding rail segment 164 can be disposed in the position shown in Fig. 20 where it spans the distance across the cut-out portion 161. At this time the supporting and rotating wheels 142 are disposed in their lowered or inoperative position illustrated at 142a in Fig. 20. A railway car or train of cars can then pass from left to right, for example, from the fixed track rails 98 shown in Fig. 12 across the normally disposed rail 103 of rail assembly 97, and then can pass over rail segments 163 and 162 and then across the closed sliding rail segment 164 that is now in the position shown in Fig. 20 and finally over fixed rail segments 170 and 171 onto normally disposed rail 103 of the opposite rail assembly 97 and thence onto the fixed track rails 98 that are disposed at the right hand end of the pit shown in Fig. 12.

Again referring to Figs. 12 and 13 each of the sliding rail segments 164 is actuated by a hydraulic cylinder assembly generally indicated at 172. This cylinder 172 includes a plunger 173 that operates in the cylinder 172 and that is secured at its free end to a lug 174 by means of bolts 175. This lug 174 is an integral part of the sliding rail segment 164. The opposite end of the hydraulic cylinder 172 is provided with a bifurcated projection 176 that is secured as at 177 to a block 178 that is fastened as at 179 onto the plate 101. The hydraulic cylinder 172 is provided with inlet and outlet ports (not shown) for the passage of a hydraulic fluid or like substance which actuates the plunger 173 to transmit sliding movement to the sliding rail segment 164. Thus the sliding rail segment 164 is actuated by the hydraulic cylinder 172.

*Operation*

In its operation let it first be assumed that the present device is arranged as shown in Fig. 20 with the sliding rail segments 164 disposed in their closed positions traversing the openings formed by the cut-out portions 161 (Fig. 13) in the side frames 126. A railroad car having faulty wheels that are to be trued is then rolled over the pit in the manner previously described until the wheels that are to be trued are disposed in their proper position over the lowered supporting and rotating wheels 142a as shown in Fig. 20. In bringing the wheels to this position over the supporting and rotating wheels the car may be either from the right or from the left with respect to the pit. As viewed in Fig. 20 it will be assumed that the left hand wheels illustrated at 140a are the first ones to be trued so that when in position over the supporting and rotating wheels 142a the car wheels are disposed as is shown in solid lines in Fig. 20. The supporting and rotating wheels 142a are next raised to their elevated position by actuation as previously described of the hydraulic cylinder 148 so that the supporting and rotating wheels 142a engage the tread and flange of car wheels 140a as illustrated in Fig. 21 where the supporting and rotating wheels are designated by reference numeral 142. A wheel block 119 (Fig. 21) is then applied to wheel 140b on the inner side thereof as previously described. This wheel block 119 is fastened to the rail assembly 97 by pins 120 (Fig. 29) cooperating with slots 118 in the tops of the rails 103 and 104. Next the rail assembly 97 including rails 103 and 104 is moved to the right (as viewed in Fig. 21) by actuation of the hydraulic jack 108 (see Figs. 26 and 27) so as to firmly wedge the wheel block 119 against wheel 140b and actually take up the play or slack in the wheel and truck assembly to thereby rigidly fix the position of car wheel 140a on the supporting and rotating wheel 142. At this point the sliding rail segment 164 is retracted by operation of the hydraulic cylinder 172 to the position illustrated in Fig. 21, thus clearing the area beneath each of the car wheels 140a for application of the wheel truing device. Next the truing device is brought into the position illustrated in Fig. 14 with the centers 138 engaging the centers of the car axle 139 and with the cutter tools 141 applied to the lowermost face of the plates and flanges of wheels 140a. The supporting and rotating wheels 142 are now rotated by means of the motor 150 (Fig. 13) operating through the drive mechanism previously described and the cutter tools 141 (Fig. 14) are caused to rotate and to make their cut around the periphery of wheels 140a.

After the wheels 140a have been trued the truing machine 92 is again moved out of the way in the manner previously described. The sliding rail segment 164 is moved to its closed position illustrated in Fig. 20 and the rail assembly 97 at the right hand side of the figure is returned to its initial position by operation of the corresponding hydraulic jack 108. The supporting and rotating wheels 142 are again lowered to the dotted line position 142a shown in Fig. 20. Wheel blocks 119 are then removed and the car is moved so that the truck assumes the position illustrated in broken lines in Fig. 20 with wheel 140a now disposed considerably to the left of the supporting and rotating wheels 142a and with wheels 140b disposed directly over the supporting and rotating wheels 142a. The operation of blocking the truck by means of blocks 119 is then repeated except that in this instance the block is applied to wheel 140a as illustrated at 119a in Fig. 20. The remaining operations are performed for truing wheels 140b except that in this instance the rail assembly 97 disposed at the left hand side of Fig. 20 is moved to take up the play in the truck parts so as to rigidly fix car wheels 140b on the supporting and rotating wheels 142a. When the truing operation is completed on car wheels 140b the car is then moved over the pit until another truck assumes its position over the pit or the car can be withdrawn entirely if no further wheel truing is required.

It is, of course, recognized that instead of a single car, a train of cars can be passed over the pit and each pair of wheels on each truck of the entire train can be trued by progressively moving the train of cars over the pit to the proper position for performing the truing operation in each instance.

In certain instances it may be desirable to utilize a clamp for holding down the car truck during the machining operation. For this purpose a clamp illustrated generally at 180 in Figs. 23 to 25 inclusive may be utilized. This clamp comprises a main body portion 181 that includes a pair of side walls 182 (Fig. 24) connected by a rear rail head engaging portion 183 and a forward rail flange engaging portion 184. The rail head engaging portion 183 and the rail flange engaging portion 184 are both disposed adjacent to the lower edge of the side walls 182. A transversely extending fulcrum member 185 connects the side walls 182 adjacent to the upper edge thereof. A lever arm member 186 is provided with a car wheel engaging button 187 at one end thereof and is apertured at the other end thereof at 188 to receive a screw 189. This lever arm member 186 is adapted to engage the underneath face of the fulcrum member 185 and is serrated on its upper face as at 190 in the region where it engages the underneath face of the fulcrum member 185. This underneath face of the fulcrum member 185 is similarly serrated. The clamp 180 is applied as shown in Fig. 25 with the car wheel button 187 engaging the car wheel illustrated in broken lines at 140 and the screw 189 resting at its lower end on the rail flange engaging member 184 is then tightened so as to cause the car wheel engaging button 187 to exert a downward force on the car wheel 140 to thus clamp the car wheel tightly against the rail 103.

As shown in Figs. 17 and 21 of the drawings the supporting and rotating wheels 142 have a smooth peripheral surface. It may be desirable in order to increase the traction force to provide knurled or otherwise roughened peripheral surfaces for these wheels and this can be accomplished very readily by simply removing the wheels shown and threading onto the ends of shaft 143 new supporting wheels or rollers having such roughened peripheral surfaces.

A removable cover plate 200 (Figs. 12, 13, 18 and 19) serves to cover the supporting and rotating wheel assembly 96. A second removable cover plate 201 (Figs. 12, 13 and 22) serves as a cover for the wheel truing machine supporting frame.

The supporting and rotating wheel assembly 96 is bolted down onto the foundation wall 85 by bolts 202 (see Fig. 17).

We claim:

1. The combination of parallel spaced track rails, each track rail comprising rail segments arranged in end to end relationship, supporting means for the rail segments, one of said rail segments being slidable on the supporting means in a longitudinal direction with respect to the rail length so that the rail segments may be separated, and a roller rotatably mounted about a horizontal axis and disposed adjacent to each track rail where the rail segments adjoin, the top of each roller being substantially flush with the top of the adjacent rail.

2. The combination of a pit, a pair of parallel, horizontally spaced track rails disposed over the pit, each track rail comprising rail segments arranged in end to end relationship, supporting means for the rail segments, one of said rail segments being slidable on the supporting means in a longitudinal direction with respect to the rail length so that the rail segments may be separated to provide a region above the pit that is unobstructed by the tracks, and a roller rotatably mounted about a horizontal axis and disposed adjacent to each track rail where the rail segments adjoin, the top of each roller being substantially flush with the top of the adjacent rail.

3. The combination of a pit, a pair of parallel, horizontally spaced track rails at the opposite ends of the pit but ending adjacent to the pit ends, rail members over the pit extending between the ends of the spaced rails and forming continuations of the rails in the region over the pit, each rail member including rail segments disposed in substantially abutting relationship, means mounting at least one of the rail segments of each rail member for horizontal movement in a longitudinal direction with respect to the rail member, and a rotatable support including a horizontal shaft disposed transversely between the rail members adjacent to the position where the rail segments abut, and a rotatable supporting wheel adjacent to each rail member and mounted on the shaft.

4. The combination of a pit, a pair of parallel, horizontally spaced track rails at the opposite ends of the pit but ending adjacent to the pit ends, rail members over the pit extending between the ends of the spaced rails and forming continuations of the rails in the region over the pit, each rail member including rail segments disposed in substantially abutting relationship, means mounting at least one of the rail segments of each rail member for horizontal movement in a longitudinal direction with respect to the rail member, and power means mounted in fixed relationship with respect to the rail member and connected to the movable rail segments.

5. The combination of a pit, a pair of parallel, horizontally spaced track rails at the opposite ends of the pit but ending adjacent to the pit ends, rail members over the pit extending between the ends of the spaced rails and forming continuations of the rails in the region over the pit, each rail member including rail segments disposed in substantially abutting relationship, means mounting all rail segments for horizontal movement in a longitudinal direction with respect to the rail member, and a rotatable support including a horizontal shaft disposed transversely between the rail members adjacent to the position where the rail segments abut, and a rotatable supporting wheel adjacent to each rail member and mounted on the shaft.

6. The combination of a pit, a pair of parallel, horizontally spaced track rails at the opposite ends of the pit but ending adjacent to the pit ends, rail members over the pit extending between the ends of the spaced rails and forming continuations of the rails in the region over the pit, each rail member including rail segments disposed in substantially abutting relationship, means mounting at least one of the rail segments of each rail member for horizontal movement in a longitudinal direction with respect to the rail member, and a rotatable support including a rotatable roller disposed adjacent to each rail member at the positions where the track segments abut, and power means connected to the rollers for rotating the rollers.

7. The combination of a pit, a pair of parallel, horizontally spaced track rails at the opposite ends of the pit but ending adjacent to the pit ends, rail members over the pit extending between the ends of the spaced rails and forming continuations of the rails in the region over the pit, each rail member including rail segments disposed in substantially abutting relationship, means mounting at least one of the rail segments of each rail member for horizontal movement in a longitudinal direction with respect to the rail member, a beam disposed adjacent to the inside of each movable rail segment and extending across the pit in a direction parallel to the rails, and a rotatable support including a horizontal shaft journalled in the beams and disposed transversely between the rail members adjacent to the position where the rail segments abut, and a rotatable supporting wheel where adjacent to each rail member and mounted on the shaft, and power means connected in driving relationship with the supporting wheels.

8. The combination of a pit, a pair of parallel, horizontally spaced track rails at the opposite ends of the pit but ending adjacent to the pit ends, rail members over the pit extending between the ends of the spaced rails and forming continuations of the rails in the region over the pit, each rail member comprising a continuous beam spanning the distance across the pit and disposed to one side of the horizontal projection of the corresponding track rail, and a pair of track segments supported on the beam and lying in the horizontal projection of the track rail, at least one of the rail segments being horizontally movable in a longitudinal direction with respect to the rail member, and a rotatable support including a horizontal shaft disposed transversely between the rail members adjacent to the position where the rail segments abut, and a rotatable supporting wheel adjacent to each rail member and mounted on the shaft.

9. The combination of a pit, a pair of parallel, horizontally spaced track rails at the opposite ends of the pit but ending adjacent to the pit ends, rail members over the pit extending between the ends of the spaced rails and forming continuations of the rails in the region over the pit, each rail member including rail segments disposed in substantially abutting relationship, means mounting at least one of the rail segments of each rail member for movement away from the adjoining rail segment, and a rotatable support including a horizontal shaft disposed transversely between the rail members adjacent to the position where the rail segments abut, and a rotatable supporting wheel disposed adjacent to the inside edge of each rail member and mounted on the shaft.

10. The combination of parallel spaced track rails, each track rail including rail segments arranged in end to end relationship with a segment in one rail being oppositely disposed with respect to the corresponding segment in another rail, means mounting at least one of the corresponding rail segments of each rail for movement with respect to the adjacent rail segment so as to provide openings in the track rails, and a roller rotatably mounted about a horizontal axis and disposed adjacent to each track rail where the movable rail segments adjoin their adjacent rail segments, the top of each rail being substantially flush with the top of the adjacent rail.

11. The combination of parallel spaced track rails, at least one of said track rails comprising rail segments arranged substantially in end to end relationship, supporting means for the rail segments, at least one of said rail segments being slidable on the supporting means in a longitudinal direction with respect to the rail length so as to be separated from the other rail segment, and a roller disposed closely adjacent to the track rail on the side toward the other track rail and mounted to rotate about a horizontal axis disposed at right angles to the length of the rails.

12. The combination of parallel spaced track rails, each track rail comprising rail segments arranged substantially in end to end relationship, supporting means for the rail segments, one of said rail segments being slidable on the supporting means in a longitudinal direction with respect to the rail length so as to be separated from the other rail segment, and a roller disposed closely adjacent to each track rail on the side toward the other track rail, the rollers being mounted to operate about a common horizontal axis disposed at right angles to the length of the rails.

13. The combination of parallel spaced track rails, at least one of said track rails comprising rail segments arranged substantially in end to end relationship, supporting means for the rail segments, at least one of said rail segments being slidable on the supporting means in a longitudinal direction with respect to the rail length so as to be separated from the other rail segment, and a roller disposed closely adjacent to the track rail on the side toward the other track rail and mounted to rotate about a horizontal axis disposed at right angles to the length of the rails, the roller being disposed with its upper edge projecting slightly above the upper edge of the track.

14. The combination of parallel spaced track rails, at least one of said track rails comprising rail segments arranged substantially in end to end relationship, supporting means for the rail segments, at least one of said rail segments being slidable on the supporting means in a longitudinal direction with respect to the rail length so as to be separated from the other rail segment, and a roller disposed closely adjacent to the track rail on the side toward the other track rail and mounted to rotate about a horizontal axis disposed at right angles to the length of the rails, and an arm pivotally mounted adjacent to its lower end to the rail supporting means, the roller being rotatably mounted on the arm adjacent to the upper end of the arm, the arm and the roller being movable from an upright position where the roller projects above the rail to a lowered position where the roller is below the upper edge of the rail.

15. The combination of parallel spaced track rails, each track rail comprising rail segments arranged substantially in end to end relationship, supporting means for the rail segments, one of said rail segments being slidable on the supporting means in a longitudinal direction with respect to the rail length so as to be separated from the other rail segment, and a roller disposed closely adjacent to each track rail on the side toward the other track rail, the rollers being mounted to operate about a common horizontal axis disposed at right angles to the length of the rails, and an arm pivotally mounted adjacent to its lower end to each rail supporting means, each roller being rotatably mounted on and adjacent to the upper end of the arm, the arm and the roller being movable from an upright position where the roller projects above the rail to a lowered position where the roller is below the upper edge of the rail.

16. The combination of a pit, a pair of parallel, horizontally spaced track rails disposed over the pit, each track rail comprising rail segments arranged in end to end relationship, supporting means for the rail segments, one of said rail segments being slidable on the supporting means in a longitudinal direction with respect to the rail length so that the rail segments may be separated, and a roller rotatably mounted about a horizontal axis and disposed adjacent to each track rail where the rail segments adjoin, the top of each roller being disposed no higher than the top of the adjacent rail.

17. The combination of a pit, a pair of parallel, horizontally spaced track rails disposed over the pit, each track rail comprising rail segments arranged in end to end relationship, supporting means for the rail segments, one of said rail segments being slidable on the supporting means in a longitudinal direction with respect to the rail length so that the rail segments may be separated, and a roller rotatably mounted about a horizontal axis and disposed adjacent to each track rail where the rail segments adjoin, the rollers being mounted on an arm for pivoting from an inoperative position below the top of the adjacent rail to an upright position above the top of the adjacent rail.

18. The combination of a pit, a pair of parallel, horizontally spaced track rails at the opposite ends of the pit but ending adjacent to the pit ends, rail members over the pit extending in the region between the ends of the spaced rails and forming continuations of the rails, each rail member comprising a rail segment assembly including a fixed horizontal, supporting base, a pair of horizontally spaced, substantially parallel rail segments mounted on the base, one of said last named rail segments being aligned with the adjacent track rail and forming substantially a continuation thereof, and means securing the rail segments together to act as a unitary structure, each rail segment assembly being slidable on its supporting base in a longitudinal direction with respect thereto.

19. The combination of a pit, a pair of parallel, horizontally spaced track rails at the opposite ends of the pit but ending adjacent to the pit ends, rail members over the pit extending in the region between the ends of the spaced rails and forming continuations of the rails, each rail member comprising a rail segment assembly including a fixed horizontal, supporting base, a pair of horizontally spaced, substantially parallel rail segments mounted on the base, one of said last named rail segments being aligned with the adjacent track rail and forming substantially a continuation thereof, and means securing the rail segments together to act as a unitary structure, each rail segment assembly being slidable on its supporting base in a longitudinal direction with respect thereto, and power actuated means operatively connected to the rail segment assembly to slide the assembly on its supporting base.

20. The combination of a pit, a pair of parallel, horizontally spaced track rails at the opposite ends of the pit but ending adjacent to the pit ends, rail members over the pit extending in the region between the ends of the spaced rails and forming continuations of the rails, each rail member comprising a rail segment assembly including a fixed horizontal, supporting base, a pair of horizontally spaced, substantially parallel rail segments mounted on the base, one of said last named rail segments being aligned with the adjacent track rail and being normally disposed in substantial abutting relationship with the end of the adjacent track rail so as to form substantially a continuation thereof, and means securing the rail segments together to act as a unitary structure, each rail segment assembly being slidable on its supporting base in a longitudinal direction away from the adjacent track rail, and resilient means normally urging the rail segment assembly toward the adjacent track rail.

21. The combination of a pit, a pair of parallel, horizontally spaced track rails at the opposite ends of the pit but ending adjacent to the pit ends, rail members over the pit extending in the region between the ends of the spaced rails and forming continuations of the rails, each rail member comprising a rail segment assembly including a fixed horizontal, supporting base, a pair of horizontally spaced, substantially parallel rail segments mounted on the base, one of said last named rail segments being aligned with the adjacent track rail and forming substantially a continuation thereof, and means securing the rail segments together to act as a unitary structure, each rail segment assembly being slidable on its supporting base in a longitudinal direction with respect thereto, the last named rail segment being slotted at spaced intervals throughout at least a portion of its length.

22. The combination of a pit, a pair of parallel, horizontally spaced track rails at the opposite ends of the pit but ending adjacent to the pit ends, rail members over the pit extending in the region between the ends of the spaced rails and forming continuations of the rails, each rail member comprising a rail segment assembly including a fixed horizontal, supporting base, a pair of horizontally spaced, substantially parallel rail segments mounted on the base, one of said last named rail segments being aligned with the adjacent track rail and forming substantially a continuation thereof, and means securing the rail segments together to act as a unitary structure, each rail segment assembly being slidable on its supporting base in a longitudinal direction with respect thereto, the last named rail segment being slotted at spaced intervals throughout at least a portion of its length, and a car wheel block adapted to be supported on the last named rail, said wheel block having locking means adapted to engage said slots.

23. The combination of a pit, a pair of parallel, horizontally spaced track rails at the opposite ends of the pit but ending adjacent to the pit ends, rail members over the pit extending in the region between the ends of the spaced rails and forming continuations of the rails, each rail member comprising a rail segment assembly including a fixed horizontal, supporting base, at least one horizontally disposed rail segment mounted on the base and being aligned with the adjacent track rail and forming a substantial continuation thereof, and being slidable on the base in a longitudinal direction with respect to the track rail.

24. The combination of spaced longitudinally disposed track rails, a rail member in the space between the track rails, each rail member comprising a rail segment assembly including a fixed horizontal supporting base, a pair of horizontally spaced, substantially parallel rail segments mounted on the base, one of said last named rail segments being aligned with the adjacent track rail and forming substantially a continuation thereof, and means securing the rail segments together to act as a unitary structure, each rail segment assembly being slidable on its supporting base in a longitudinal direction with respect thereto.

25. The combination of spaced longitudinally disposed track rails, a rail member in the space between the track rails, but having one end disposed closely adjacent to the end of one track rail and extending toward the other track rail, the rail member stopping short of the other track rail to provide a space therebetween, a slidable rail segment adapted to close said last named space, each rail member comprising a rail segment assembly including a fixed horizontal supporting base, a pair of horizontally spaced, substantially parallel rail segments mounted on the base, one of said last named rail segments being aligned with the adjacent track rail and forming substantially a continuation thereof, and means securing the rail segments together to act as a unitary structure, each rail segment assembly being slidable on its supporting base in a longitudinal direction with respect thereto.

26. The combination of spaced longitudinally disposed track rails, a rail member in the space between the track rails but having one end disposed closely adjacent to the end of one track rail and extending toward the other track rail, the rail member stopping short of the other track rail to provide a space therebetween, a slidable rail segment adapted to close said last named space and mounted to slide from a position closing the last named space to a position alongside the track rail, and a car wheel supporting and rotating wheel disposed adjacent to the rail member at one end of the last mentioned space.

27. The combination of a supporting and driving wheel, a wheeled vehicle disposed over the supporting and driving wheel with one wheel of the vehicle mounted on the supporting and driving wheel and engaging the supporting and driving wheel at a position disposed to one side of the vertical projection of the vehicle wheel center so as to be rotated by the driving wheel, the supporting and driving wheel supporting the entire weight on said vehicle wheel, means engaging another wheel of the vehicle for holding the said first wheel of the vehicle on the supporting and driving wheel, and power means operatively connected to the supporting and driving wheel for rotating same.

28. The combination of a supporting and driving wheel, a vehicle mounted on wheeled trucks and disposed over the supporting and driving wheel with one wheel of the truck mounted eccentrically on the supporting and driving wheel and engaging the supporting and driving wheel at a position disposed to one side of the vertical projection of the vehicle wheel center so as to be rotated by the driving wheel, the supporting and driving wheel supporting the entire weight on said vehicle wheel, means engaging another vehicle wheel of the truck for firmly holding the first truck wheel on the supporting and driving wheel, and power means operatively connected to the supporting and driving wheel for rotating same.

29. The combination of spaced longitudinally disposed track rails, a rail member in the space between the track rails but having one end disposed closely adjacent to the end of one track rail and extending toward the other track rail, the rail member stopping short of the other track rail to provide a space therebetween, a slidable rail segment adapted to close said last named space and mounted to slide from a position closing the last named space to a position alongside the track rail, a supporting and driving wheel disposed adjacent to the rail member at one end of the last mentioned space, a wheeled vehicle mounted on the rail member and disposed with one vehicle wheel mounted eccentrically on the supporting and driving wheel, and power means operatively connected to the supporting and driving wheel for rotating same, the rotation of the supporting and driving wheel imparting rotation to the eccentrically mounted vehicle wheel.

30. The combination of spaced longitudinally disposed track rails, a rail member in the space between the track rails but having one end disposed closely adjacent to the end of one track rail and extending toward the other track rail, the rail member stopping short of the other track rail to provide a space therebetween, a movable rail segment adapted to close said last named space and mounted to move from a position closing the last named space to a removed position where the space is left open, a supporting and driving wheel disposed adjacent to the rail member at one end of the last mentioned space, a wheeled vehicle mounted on the rail member and disposed with one vehicle wheel mounted eccentrically on the supporting and driving wheel, and power means operatively connected to the supporting and driving wheel for rotating same, the rotation of the supporting and driving wheel imparting rotation to the eccentrically mounted vehicle wheel.

RICHARD B. STANLEY.
BERNARD PASS.

REFERENCES CITED

The following references are of record in the file of this patent:

UNITED STATES PATENTS

| Number | Name | Date |
|---|---|---|
| 421,377 | Barr | Feb. 18, 1890 |
| 683,554 | Cuttler et al. | Oct. 1, 1901 |
| 1,136,124 | Griffin et al. | Apr. 20, 1915 |
| 1,171,812 | Vial | Feb. 15, 1916 |
| 1,627,074 | Blair et al. | May 3, 1927 |
| 2,180,529 | Kaseberg | Nov. 21, 1939 |

Certificate of Correction

Patent No. 2,622,378 December 23, 1952

RICHARD B. STANLEY ET AL.

It is hereby certified that error appears in the printed specification of the above numbered patent requiring correction as follows:

Column 15, line 17, strike out "where";

and that the said Letters Patent should be read as corrected above, so that the same may conform to the record of the case in the Patent Office.

Signed and sealed this 19th day of May, A. D. 1953.

[SEAL]

THOMAS F. MURPHY,
*Assistant Commissioner of Patents.*

Certificate of Correction

Patent No. 2,622,378 December 23, 1952

RICHARD B. STANLEY ET AL.

It is hereby certified that error appears in the printed specification of the above numbered patent requiring correction as follows:

Column 15, line 17, strike out "where";

and that the said Letters Patent should be read as corrected above, so that the same may conform to the record of the case in the Patent Office.

Signed and sealed this 19th day of May, A. D. 1953.

[SEAL]

THOMAS F. MURPHY,
*Assistant Commissioner of Patents.*